United States Patent [19]
Ito et al.

[11] Patent Number: 5,267,160
[45] Date of Patent: Nov. 30, 1993

[54] STEERING CONTROL SYSTEM FOR VEHICLE

[75] Inventors: Ken Ito, Yokohama; Yoshinori Yamamura, Yokosuka, both of Japan

[73] Assignee: Nissan Motor Co., Ltd., Yokohama, Japan

[21] Appl. No.: 693,286

[22] Filed: Apr. 30, 1991

[30] Foreign Application Priority Data

| May 2, 1990 [JP] | Japan | 2-115272 |
| May 2, 1990 [JP] | Japan | 2-115273 |

[51] Int. Cl.⁵ .................................................. B62D 5/00
[52] U.S. Cl. ............................. 364/424.05; 180/141; 180/79.1
[58] Field of Search ............ 364/424.05, 424.01; 280/91; 180/79.1, 140, 141

[56] References Cited

U.S. PATENT DOCUMENTS

| 3,866,706 | 2/1975 | Lincke et al. | 180/79.2 R |
| 4,706,771 | 11/1987 | Kawake et al. | 180/142 |
| 4,720,790 | 1/1988 | Miki et al. | 364/424.05 |
| 4,834,205 | 5/1989 | Mizuno et al. | 180/141 |
| 4,840,389 | 6/1989 | Kawabe et al. | 280/91 |
| 5,053,966 | 10/1991 | Takahashi et al. | 364/424.05 |
| 5,151,860 | 9/1992 | Taniguchi et al. | 364/424.05 |

FOREIGN PATENT DOCUMENTS

| 3734477 | 10/1987 | Fed. Rep. of Germany . |
| 3930445 | 9/1989 | Fed. Rep. of Germany . |
| 62-247979 | 10/1987 | Japan . |

OTHER PUBLICATIONS

Ken Ito et al. "A New Way of Controlling a Four Wheel Steering Vehicle" pp. 50-54 vol. 23, No. 8 Aug. 1987 Keisokujidoseigyogakkai Ronbunshu.

Takeshi Fujishiro et al. "Four-wheel Steering System Employing Model-following Control" vol. 42, No. 3, 1988 pp. 304-310 Jidosha Gijutsu (Automotive Engineering).

*Primary Examiner*—Thomas G. Black
*Attorney, Agent, or Firm*—Foley & Lardner

[57] ABSTRACT

A steering control system for a wheeled vehicle, comprises a steering actuator for steering the vehicle by varying one of front and rear wheel steer angles in response to a control signal representing a control steering input, a sensor for sensing a vehicle motion such as a yaw rate, and a controller for controlling the vehicle motion by producing the control signal. The controller determines an estimated vehicle motion variable from a driver's steering command and the control steering input by using one or more predetermined estimator transfer characteristics, compares the sensed and estimated vehicle motion variables to determine a deviation therebetween, and determines the control steering input so as to reduce the deviation by using a predetermined compensator transfer characteristic and a predetermined filter transfer characteristic for filtering the deviation.

28 Claims, 22 Drawing Sheets

FIG.14

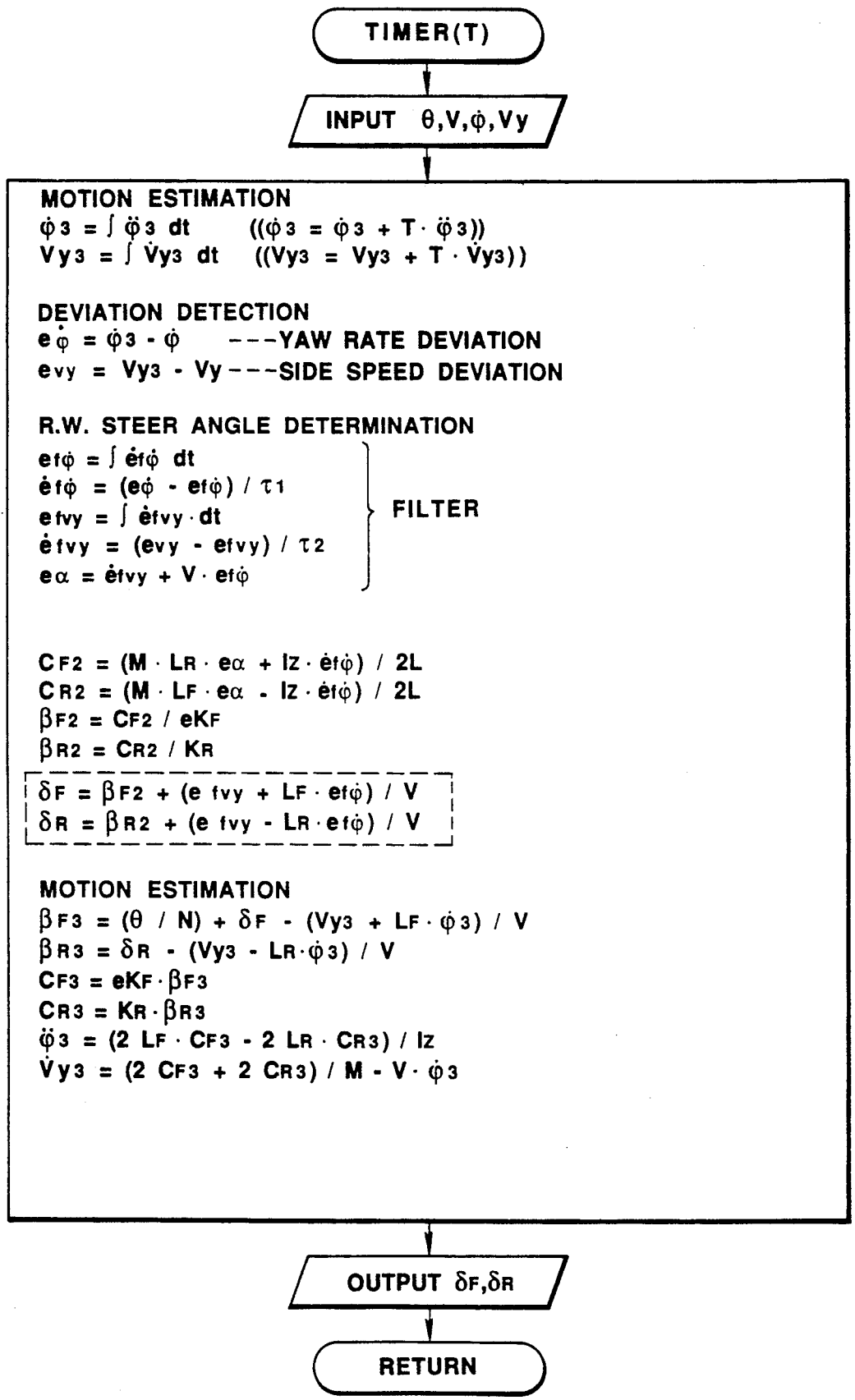

TIMER(T)

INPUT $\theta, V, \dot\phi, V_y$

MOTION ESTIMATION
$\dot\phi_3 = \int \ddot\phi_3\, dt \quad ((\dot\phi_3 = \dot\phi_3 + T\cdot\ddot\phi_3))$
$V_{y3} = \int \dot V_{y3}\, dt \quad ((V_{y3} = V_{y3} + T\cdot\dot V_{y3}))$

DEVIATION DETECTION
$e_{\dot\phi} = \dot\phi_3 - \dot\phi \quad \text{---YAW RATE DEVIATION}$
$e_{vy} = V_{y3} - V_y \text{---SIDE SPEED DEVIATION}$

R.W. STEER ANGLE DETERMINATION
$e_{f\dot\phi} = \int \dot e_{f\dot\phi}\, dt$
$\dot e_{f\dot\phi} = (e_{\dot\phi} - e_{f\dot\phi})/\tau_1$
$e_{fvy} = \int \dot e_{fvy}\cdot dt$ } FILTER
$\dot e_{fvy} = (e_{vy} - e_{fvy})/\tau_2$
$e_\alpha = \dot e_{fvy} + V\cdot e_{f\dot\phi}$ $C_{F2} = (M\cdot L_R\cdot e_\alpha + I_z\cdot \dot e_{f\dot\phi})/2L$
$C_{R2} = (M\cdot L_F\cdot e_\alpha - I_z\cdot \dot e_{f\dot\phi})/2L$
$\beta_{F2} = C_{F2}/eK_F$
$\beta_{R2} = C_{R2}/K_R$ $\delta_F = \beta_{F2} + (e_{fvy} + L_F\cdot e_{f\dot\phi})/V$
$\delta_R = \beta_{R2} + (e_{fvy} - L_R\cdot e_{f\dot\phi})/V$

MOTION ESTIMATION
$\beta_{F3} = (\theta/N) + \delta_F - (V_{y3} + L_F\cdot\dot\phi_3)/V$
$\beta_{R3} = \delta_R - (V_{y3} - L_R\cdot\dot\phi_3)/V$
$C_{F3} = eK_F\cdot\beta_{F3}$
$C_{R3} = K_R\cdot\beta_{R3}$
$\ddot\phi_3 = (2L_F\cdot C_{F3} - 2L_R\cdot C_{R3})/I_z$
$\dot V_{y3} = (2C_{F3} + 2C_{R3})/M - V\cdot\dot\phi_3$ OUTPUT $\delta_F, \delta_R$

RETURN

STEERING CONTROL SYSTEM FOR VEHICLE

BACKGROUND OF THE INVENTION

The present invention relates to a vehicle steering control system for ensuring a desired handling characteristic.

A Japanese Patent Provisional Publication No. 62-247979 discloses a convention steering control system having a feedforward compensating section for producing a desired response of yawing motion, and a feedback compensating section for suppressing disturbances. The feedback compensating section lo is designed to produce a control signal according to a proportional control action, or an integral control action or a proportional plus integral control action. This system, therefore, requires troublesome tuning operations to determine control constants, and obtain an intended handling performance.

SUMMARY OF THE INVENTION

It is an object of the pcepent invention to provide a vehicle steering control system in which it is easy to achieve intended vehicle response characteristics, and which is resistant to disturbances and changes in the characteristics of a controlled vehicle.

According to the present invention, a steering control system for a wheeled vehicle, comprises a steering means, a sensing means, and a controlling means. The steering means is a means for steering the wheeled vehicle in response to a control signal representing a control steering input such as a front or rear wheel steer angle. The senskng means is a means for sensing an actual vehicle motion variable in the wheeled vehicle. The vehicle motion variable is a physical quantity representing the steering response of the vehicle. The vehicle motion variable may be a vehicle yaw rate, or a motion variable representing a vehicle side (or lateral) translational motion. The controlling means is a means for determining an estimated vehicle motion variable, such as an estimated yaw rate, from the control steering input by using at least one predetermined estimator transfer characteristic which is a transfer characteristic designed to determine a vehicle steering response from a steering input, producing a deviation signal representing a vehicle motion deviation between the sensed actual vehicle motion and the estimated vehicle motion, and further producing the control signal in accordance with the deviation so as to reduce the deviation by using a predetermined feedback compensator transfer characteristic and a predetermined filter transfer characteristic. The compensator transfer characteristic is in the form of a function of the estimator transfer characteristic, and designed to determine a steering input from a vehicle response. The filter transfer characteristic is a transfer function which can be arbitrarily determined by a designer of the control system.

BRIEF DESCRIPTION OF THE DRAWINGS

FIG. 14 is a flowchart showing a control program of the fifth embodiment.

DETAILED DESCRIPTION OF THE INVENTION

Figure 1:
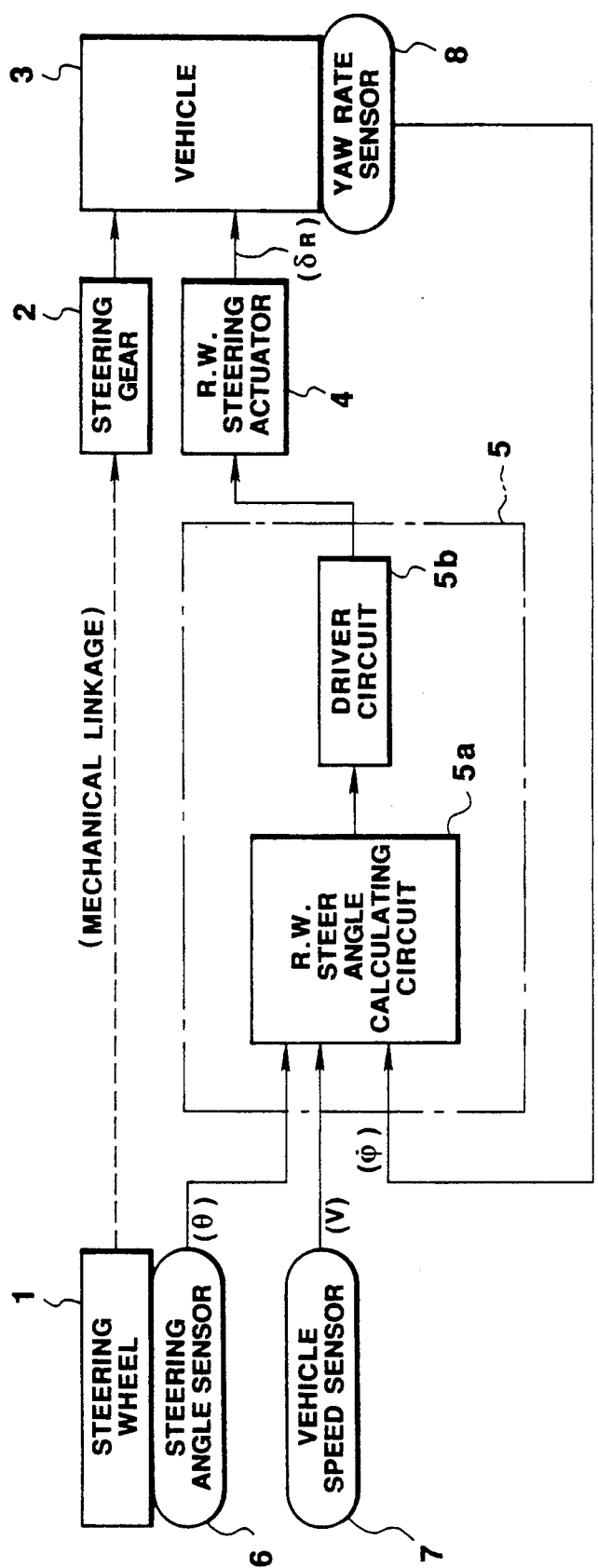
FIG. 1 is a block diagram showing a control system according to a first embodiment of the present invention.
Figure 2:
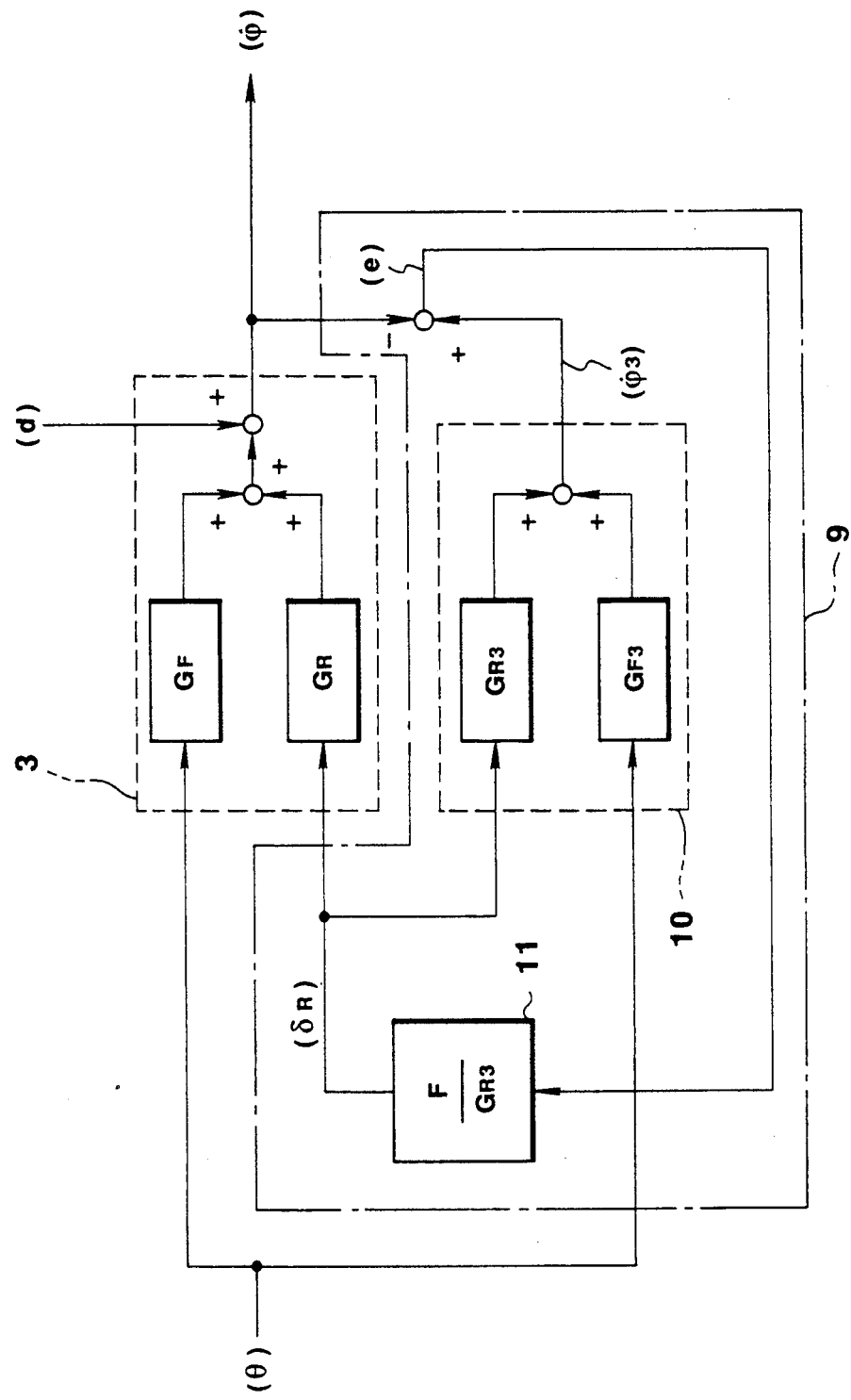
FIG. 2 is a block diagram showing the control system of the first embodiment in terms of transfer characteristics.
Figure 3:
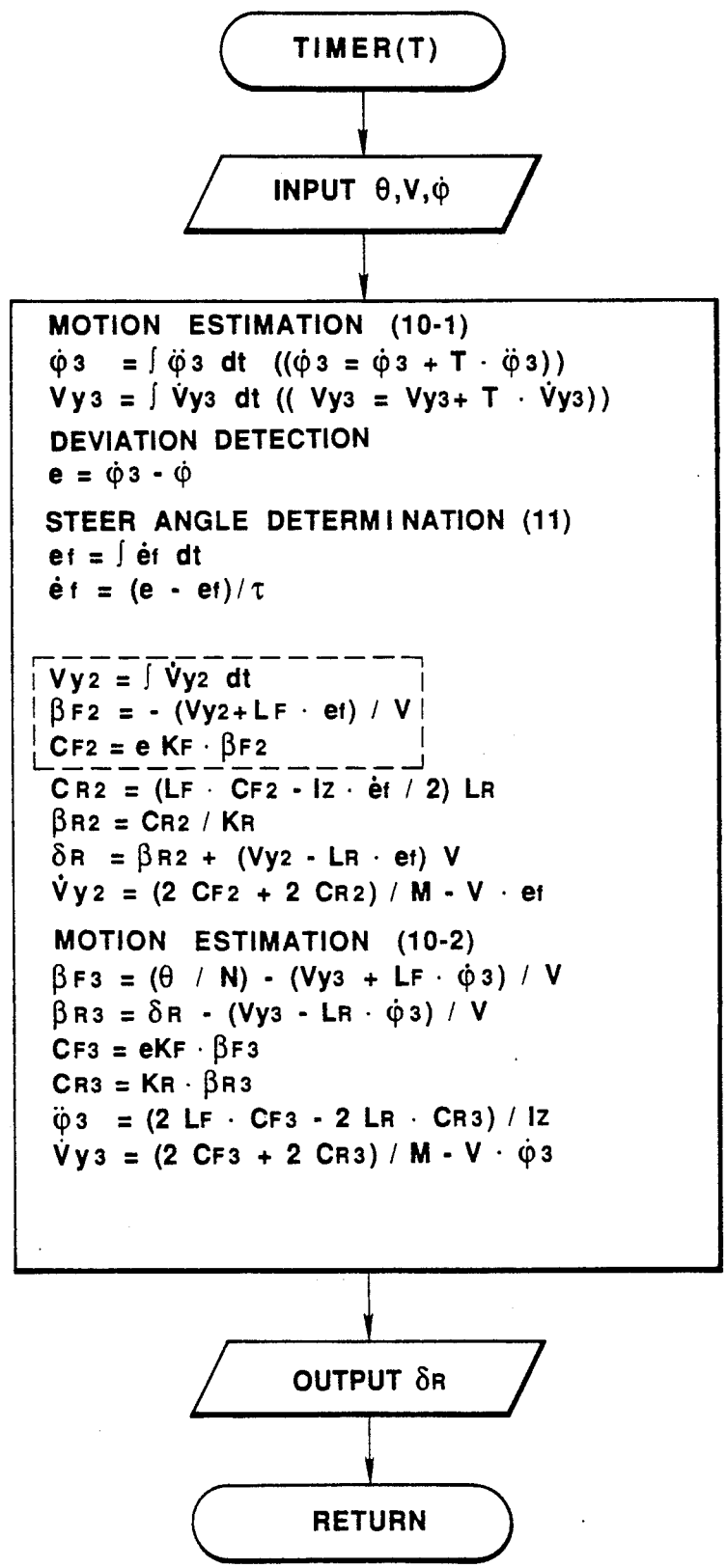
FIG. 3 is a flowchart showing a control program employed in the first embodiment.

A first embodiment of the present invention is shown in FIGS. 1–3. FIG. 1 shows the hardware of a steer angle control system according to the first embodiment of the invention. FIG. 2 shows transfer characteristics used in the control system of the first embodiment. FIG. 3 shows a control program of the first embodiment.

As shown in FIG. 1, the vehicle motion control system for a wheeled vehicle 3, such as an automobile, comprises a steering wheel 1, a steering gear 2, a rear wheel auxiliary steering actuator 4, a controller 5, a steering angle sensor 6, a vehicle speed sensor 7 and a yaw rate sensor 8.

The steering wheel 1 is connected with front wheels of the vehicle 3 through the steering gear 2 by a mechanical front steering linkage for transmitting mechanical motion (or a mechanical steering signal) from the steering wheel 1 to the front wheels. The steering gear 2 is provided in the steering linkage, and arranged to steer the front wheels in accordance with the steering angle of the steering wheel 1. The steering wheel 1 and the front steering linkage including the steering gear 2 constitute a front steering mechanism for steering the vehicle vehicle in accordance with a driver's steering command. The steering input (or steering amount) inputted to the vehicle by the front steering mechanism is a primary steering input in the form of a front wheel steer angle. The steering wheel 1 serves as a commanding means for producing a steering command signal, and the steering gear 2 serves as a mechanical determining means for determining the primary steering input in the form of the front wheel steer angle, from the driver's steering command according to a predetermined steering ratio.

The rear wheel auxiliary steering actuator 4 is provided in a rear steering linkage for rear wheels of the vehicle 3, and arranged to steer the rear wheels in response to a control signal produced by the controller 5. The controller 5 determines a control steering input (or an auxiliary steering input) in the form of a rear wheel steer angle, and the rear wheel auxiliary steering actuator 4 steers the rear wheels to place the auxiliary steering input in the rear steering linkage.

The controller 5 of the first embodiment comprises a circuit (or section) 5a for calculating the rear wheel steer angle, and a driver circuit (or section) 5b for supplying the control signal to the rear wheel auxiliary steering actuator 4.

The steering angle sensor 6 produces an electrical steering command signal which represents a driver's steering command and which is substantially proportional to the driver's steering command. In this embodiment, the steering angle sensor 6 senses the steering wheel angle $\theta$ of the steering wheel 1. The vehicle speed sensor 7 senses the vehicle speed V of the vehicle 3. The yaw rate sensor 8 senses an actual yaw rate $\dot{\phi}$ of the vehicle 3. The rear wheel steer angle calculating circuit 5a of the controller 5 is connected with the sensors 6, 7 and 8, and designed to calculate the rear wheel steer angle $\delta R$ by using the steering wheel angle $\theta$, the vehicle speed V and the yaw rate $\dot{\phi}$. The driver circuit 5b delivers the control signal representing the calculated rear wheel steer angle, and causes the rear wheel steering actuator 4 to make the actual rear wheel steer angle of the rear wheels equal to the calculated rear wheel steer angle. In this embodiment, the yaw rate $\dot{\phi}$ is employed as a vehicle planar motion variable representing a vehicle steering response. The yaw rate is a controlled variable of the control system.

As shown in FIG. 2, the vehicle 3 receives the primary steering input in the form of the steering wheel angle $\theta$, and the control steering input in the form of the rear wheel steer angle $\delta R$, and yields the actual yaw rate $\dot{\phi}$ which is a sum of a first yaw rate which is a result of the primary steering input determined by a first plant transfer function GF, and a second yaw rate which is a result of the control steering input determined by a second plant transfer characteristic GR. The actual vehicle yaw rate (vehicle response) is influenced by variations of the transfer io characteristics GF and GR, and a disturbance d such as cross wind and irregularities of the road surface. The yaw rate $\dot{\phi}$ of the vehicle varies is a function of time t, and the instantaneous yaw rate magnitude $\dot{\phi}(t)$ at a given instant (t=a given value) is determined by a dynamic yaw rate transfer characteristic of the whole of the vehicle, which is expressed as;

$$\dot{\phi} = GF(S,V) \cdot \downarrow (t) + GR(S,V) \cdot \delta R(t) + d(t) \quad (1)$$

In this equation, s is a differential operator, and V is the vehicle speed. Each of the transfer functions GF(S, V) and GR(S,V) is a function of s and V.

A rear wheel steer angle controlling system 9 shown in FIG. 2 comprises the controller 5 and the actuator 4 for producing the rear wheel steer angle. In the controlling system 9, a vehicle motion estimating section (or desired vehicle behavior determini section) 10 determines an estimated (or desired) yaw rate $\dot{\phi}3$ in accordance with the steering angle $\theta$ and the rear wheel steer angle $\delta R$, and a rear wheel steer angle controlling section 11 determines the control steering input in the form of the rear wheel steer angle $\delta R$. The estimating section 10 corresponds to a vehicle motion estimating means, and the rear wheel steer angle controlling section 11 corresponds to a feedback compensating means.

The vehicle motion estimating section 10 determines a desired yaw rate (a first desired vehicle output) resulting from the primary steering input $\theta$ according to a predetermined first estimator transfer characteristic GF3, and a desired yaw rate (a second second vehicle output) resulting from the control inppt $\delta R$ according to a predetermined second estimator transfer characteristic GR3. The transfer characteristics GF3 and GR3 are transfer characteristic of a desired vehicle. It is possible to arbitrarily determine the estimator transfer characteristics GF3 and GR3. The vehicle motion estimating section 10 determines the estimated (or desired) yaw rate $\dot{\phi}3$. by adding the first output of the first estimator transfer characteristic GF3 and the second output of the second transfer estimator transfer function GR3. That is;

$$\dot{\phi}3(t) = GF3(S,V) \cdot \theta(t) + GR3(s,V) \cdot \delta R(t) \quad (2)$$

Hereinafter, mathematical expressions are simplified by omitting (s,V) and (t).

The rear wheel steer angle controlling section 11 of the controlling system 9 receives a deviation signal representing a deviation (or error) e between the estimated yaw rate $\dot{\phi}3$ and the actual yaw rate $\dot{\phi}$ sensed by the yaw rate sensor 8, and determines the control steering input in accordance with the yaw rate deviation $e = \dot{\phi}3 - \dot{\phi}$. The controlling section 11 determines the control steering input in the form of the desired rear wheel steer angle $\delta R$ by using a predetermined compensator transfer characteristic 1/GR3, and a predetermined filter transfer characteristic (filter) F. The output signal of the controlling section 11 represents the desired rear wheel steer angle $\delta R$ which is given by;

$$\delta R = \frac{F}{GR3} \cdot e$$

The compensator characteristic 1/GR3 is in the form of the reciprocal (inverse transfer function) of the second estimator transfer characteristic GR3 between the rear wheel steer angle and the yaw rate. The filter transfer characteristic F is chosen so that a steady state gain of the filter transfer characteristic F is equal to one, and a difference obtained by subtracting the order of a numerator of the filter transfer characteristic F from the order of a denominator of the filter transfer characteristic F is equal to or higher than a difference obtained by subtracting the order of a numerator of the estimator transfer characteristic GR3 from the order of a denominator of the estimator transfer characteristic GR3 between the control input and the controlled vehicle motion variable. When a two-degree-of-freedom linear simulation model of yawing and lateral planar motions is employed, then the second estimator transfer characteristic GR3 is of the form of [first order]/[second order]. Therefore, in order to design the controlling system which requires no genuine differentiation, the filter transfer characteristic F is set as;

$$F(s) = \frac{1}{1 + \tau s} = \frac{[\text{zero order}]}{[\text{first order}]}$$

In the equation, $\tau$ is a time constant.

The vehicle motion control system arranged as shown in FIG. 2 can control the actual yaw rate of the vehicle in the following manner.

The following equation (3) corresponds to the equation (1).

$$\dot{\phi} = GF\theta + GR\delta R + d \quad (3)$$

The following equation (4) corresponds to the equation (2).

$$\dot{\phi}3 = GF3\theta + GR3\delta R \quad (4)$$

Therefore;

$$e = \dot{\phi}3 - \dot{\phi} \quad (5)$$
$$= GF3\theta + GR3\delta R - \dot{\phi}$$

The control steering input $\delta R$ is given by;

$$\delta R = \frac{F}{GR3} e \quad (6)$$

Substitution of the equation (5) into the equation (6) gives;

$$\delta R = \frac{FGF3\theta - F\dot{\phi}}{(1 - F)GR3} \quad (7)$$

Substitution of the equation (7) into the equation (3) and rearrangement gives;

$$\dot{\phi} = \frac{(1-F)GR3GF + FGF3GR}{(1-F)GR3FGR} \theta + \quad (8)$$

$$\frac{(1-F)GR3}{(1-F)GR3 + FGR} d$$

If GF and GR deviate, respectively, from GF3 and GR3 by $\Delta$GF and $\Delta$GR, so that GF = GF3 + $\Delta$GF and GR = GR3 + $\Delta$GR, and the filter characteristic deviates by $\Delta$F = 1 − F, then the equation (8) can be written as;

$$\dot{\phi} = \left[\frac{GF3GR}{GR}\right] + \frac{\Delta F(\Delta GFGR - \Delta GRG)}{\Delta F\Delta GR} \theta + \quad (9)$$

$$\frac{\Delta FGR + \Delta F\Delta GR}{GR - \Delta F\Delta GR} d$$

As evident from the equation (9), the control system of this embodiment can achieve the following advantageous effects.

(i) The control performance is stable and immutable to parameter changes (assuming d = 0).

When $\Delta$F is small, and F is close to one, the yaw rate $\dot{\phi}$ becomes equal to GF3$\theta$, as seen from the first term of the right member of the equation (9). Therefore, the actual yaw rate $\dot{\phi}$ is independent from the parameters GF and GR, and immune to changes in these parameters. As a result, the control system of this embodiment can always provide an intended stable handling performance without the need for time-consuming tunign operations.

(ii) The control performance is resistant to disturbances (assuming $\theta$ = 0).

As seen from the second term of the right member of the equation (9), the yaw rate $\dot{\phi}$ is equal to $\Delta$F·d if $\Delta$GF = 0(GF = GF3) and $\Delta$GR = 0 (GR = GR3). Therefore, if $\Delta$F is sufficiently small, the control system can reduce the influence of the disturbance d almost to zero, and prevent the handling performance of the behicle from deviating from the desired goal of the control system. Even if $\Delta$GF $\neq$ 0 and $\Delta$GR $\neq$ 0 the control system can reduce the yaw rate $\dot{\phi}$ due to the disturbance d near zero as long as $\Delta$F is small.

The controller 5 of the first embodiment controls the rear wheel steer angle by performing a rear wheel steer angle control program shown in FIG. 3 in an interrupt handling mode each time a predetermined time interval T (control cycle time) elapses. In this embodiment, controller 5 is made up of a microcomputer and one or more peripheral devices.

The controller 5 (or the CPU of the microcomputer) first reads current values of the steering angle $\theta$, the vehicle speed V, and the yaw rate $\dot{\phi}$ which are, respectively, sensed by the sensors 6, 7 and 8. Then, from these input data items, the controller 5 obtains a current value of the control steering input in the form of the rear wheel steer angle $\delta R$ in accordance with the following mathematical relationships.

The controller 5 determines a desired yaw rate $\dot{\phi}3$, and a desired side speed Vy3 by integration of a desired yaw acceleration $\ddot{\phi}3$ and a desired side acceleration $\dot{V}y3$. In general, it is difficult to perform integration by digital computation. Therefore, the controller 5 of this embodiment uses the following approximation method.

$$\dot{\phi}3 = \dot{\phi}3 + T \cdot \ddot{\phi}3$$

$$Vy3 = Vy3 + T \cdot \dot{V}y3$$

In these equations, $\dot{\phi}3$ is a previous value of the desired yaw acceleration which was determined in the last execution of the control program as explained below, and $\dot{V}y3$ is a previous value of the side acceleration which was determined in the last execution of the control program. These mathematical operations correspond to a part of the vehicle motion estimating section 10. In this and all other illustrated embodiments of the invention, this approximate integration process is used when integration is required.

Then, the controller 5 determines a yaw rate deviation (or error) $e = \dot{\phi}3 - \dot{\phi}$. This operation corresponds to a deviation detecting means for comparing a sensed actual variable with a desired variable, and determining a deviation between the sensed and desired variables. Then, the controller 5 performs a filtering process to the yaw rate deviation, in the following manner.

$$ef = \int_0^t \dot{ef} \cdot dt$$

$$\dot{ef} = (e - ef)/\tau$$

This filtering process corresponds to the following mathematical operation $$ef = \frac{1}{1 + \tau s} e$$

Then, the controller 5 determines the rear wheel steer andle $\delta R$ in accordance with known equations of vehicle motion. In this iambodiment, the controller 5 first determines a front wheel side slip angle $\beta F2$, from a side speed Vy2, a distance LF between the position of the front wheels and the center of gravity, and the vehicle speed V, according to the following equation.

$$\beta F2 = -(Vy2 + LF\cdot\theta ef)/V$$

The side speed $\dot{V}y2$ is obtained by the approximate integration of the side acceleration $\dot{V}y2$, using a previous value of the side acceleration determined in the last execution. From the thus-obtained front wheel slip angle $\beta F2$ and a front wheel equivalent cornering power $eKF$, the controller 5 further determines a front wheel cornering force CF2 according to the following equation.

$$CF2 = eKF\cdot\beta F2$$

In this way, the controller 5 estimates the cornering force produced by the front wheels due to correction. Then, the controller 5 determines a rear wheel cornering force CR2 which is required to produce $\dot{e}f$ when the front wheel cornering force CF2 is acting. The rear wheel cornering force CR2 is determined according to the following equation.

$$CR2 = (LF\cdot CF2 - IZ\cdot\ddot{e}f/2)/LR$$

In this equation, IZ is a yawing moment of inertia, and LR is a distance between the position of the rear wheels and the vehicle center of gravity. Then, the controller 5 determines a rear wheel slip angle $\beta R2$ to obtain this cornering force CR2, by a mathematical operation in a reverse direction $$\beta R2 = CR2/KR$$

In this equation, KR is a rear wheel cornering power. From this rear wheel slip angle $\beta R2$, the controller 5 determines the rear wheel steer angle $\delta R$ According to the following equation.

$$\delta R = \beta R2 + (Vy2 - LR\cdot ef)/V$$

Then, the controller 5 determines the side acceleration $\dot{V}y2$ to be used in the next control cycle to determine the side speed Vy2, according to the following equation (wherein M is a vehicle mass).

$$\dot{V}y2 = (2CF2 + 2CR2)/M - V\cdot ef$$

Then, the controller 5 determines the desired yaw acceleration $\ddot{\phi}3$, and the desired side acceleration $\dot{V}y3$ which are to be used in the next control cycle, in accordance with the following mathematical operations corresponding to the remaining part of the vehicle motion estimating section 10. First, a desired front wheel slip angle QF3 and a desired rear wheel slip angle $\beta R3$ are determined by;

$$\beta F3 = (\theta/N) - (VY3 + LF\cdot\dot{\phi}3)/V$$

$$\beta R3 = \delta R - (Vy3 - LR\cdot\dot{\phi}3)/V$$

From these desired slip angles, the controller 5 determines a desired front wheel cornering force CF3 and a desired rear wheel cornering force CR3 which are given by;

$$CF3 = eKF\cdot\beta F3$$

$$CR3 = KR\cdot\beta R3$$

Finally, the controller 5 determines the desired yaw acceleration $\ddot{\phi}3$ and the desired side acceleration $\dot{V}y3$ for use in the next Control cycle.

$$\ddot{\phi}3 = (2LF\cdot CF3 - 2LR\cdot CR3)/IZ$$

$$\dot{V}y3 = (2CF3 + 2CR3)/M - V\cdot\dot{\phi}3$$

Then, the controller 5 produces the control signal representing the thus-calculated rear wheel steer angle $\delta R$, and sends the control signal to the rear wheel steering actuator 4. In response to the control signal of the controller 5, the actuator 4 steers the rear wheels of the controlled vehicle so that the actual rear wheel steer angle is made equal to the calculated rear wheel steer angle.

Figure 4A:
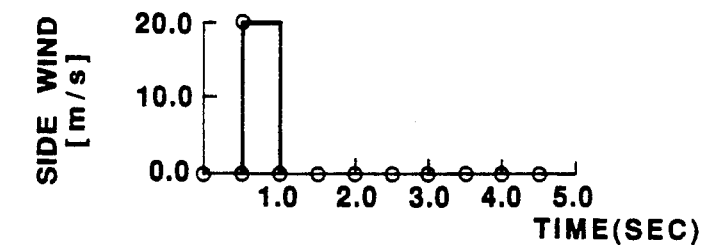
FIGS. 4A–4E are graphs illustrating effects of the control system of the first embodiment.
Figure 4B:
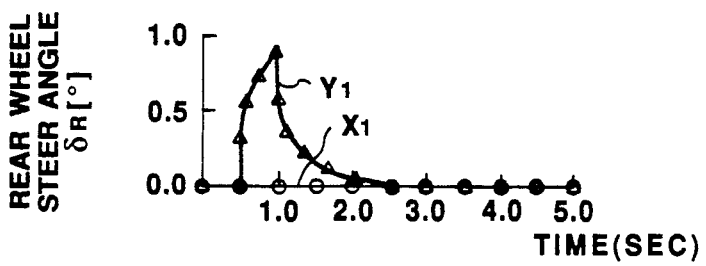
Figure 4C:
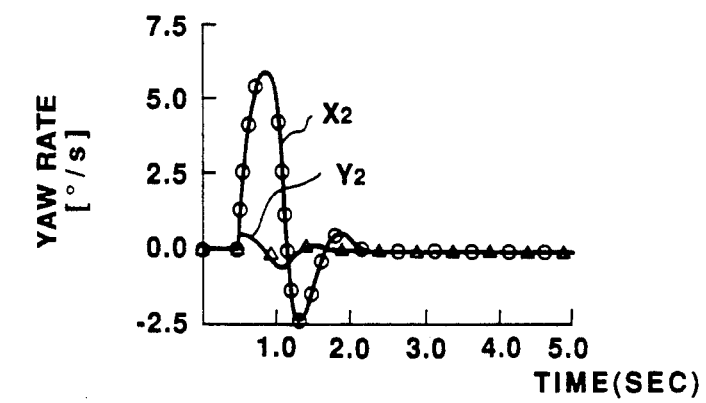
Figure 4D:
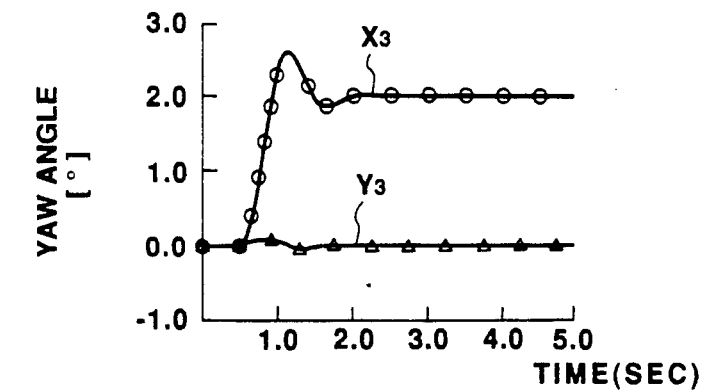
Figure 4E:
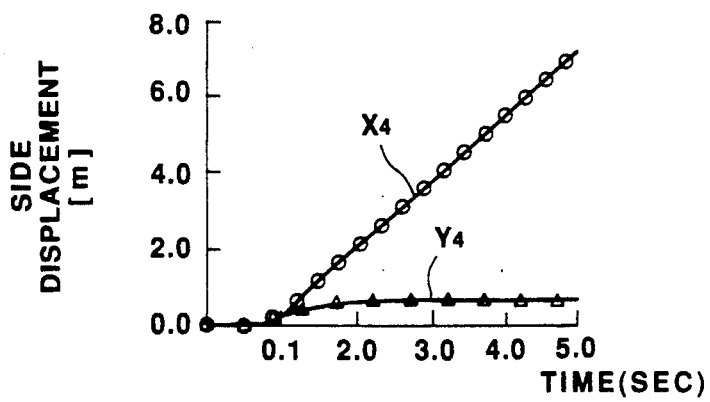

Therefore, as explained with reference to the equation (9), the control system of the first embodiment according to the present invention can minimize undesired influences of changes in the parameters GF and GR on the vehicle response of the yaw rate, and achieve the intended steering performance reliably without need for troublesome tuning operations. Furthermore, the control system can protect the steering performance from being affected by disturbances. FIGS. 4A-4E show the results of a simulation. In a conventional steering system, the rear wheel steer angle is held equal to zero as shown by a line X1 of FIG. 4B. Therefore, when a disturbance due to side wind is inputted as shown in FIG. 4A, the yaw rate, the yaw angle and the side displacement are readily affected as shown by lines X2, X3, and X4 of FIGS. 4C, 4D and 4E. In contrast to this behavior of the conventional vehicle, the control system of this embodiment can suppress the yaw rate, yaw angle and side motion of the vehicle as shown by lines Y2, Y3 and Y4 in FIGS. 4C, 4D and 4E, by controlling the rear wheel steer angle as shown by a line Y1 of FIG. 4B.

Figure 5:
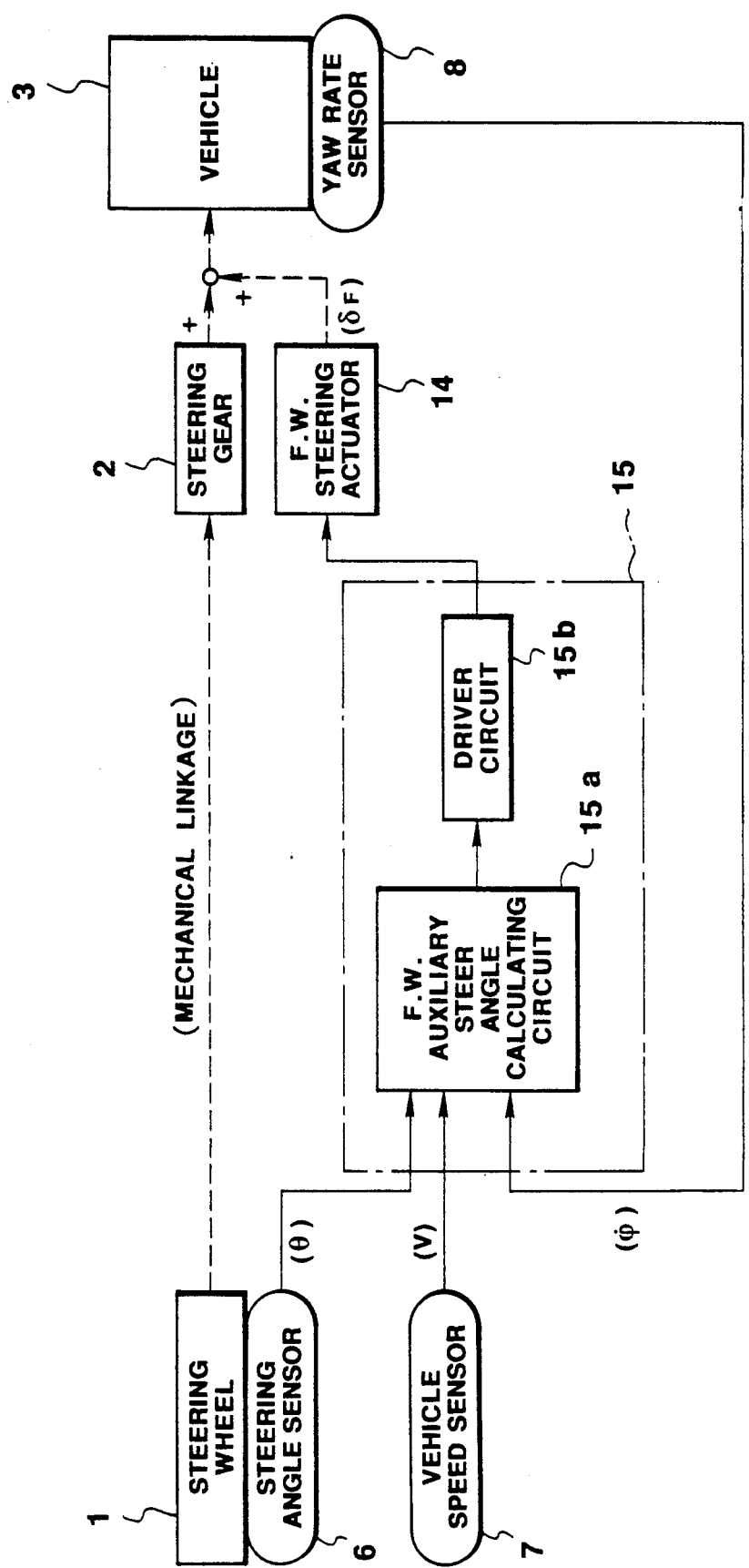
FIG. 5 is a block diagram showing a control system accordina to a second embodiment of the present invention.
Figure 6:
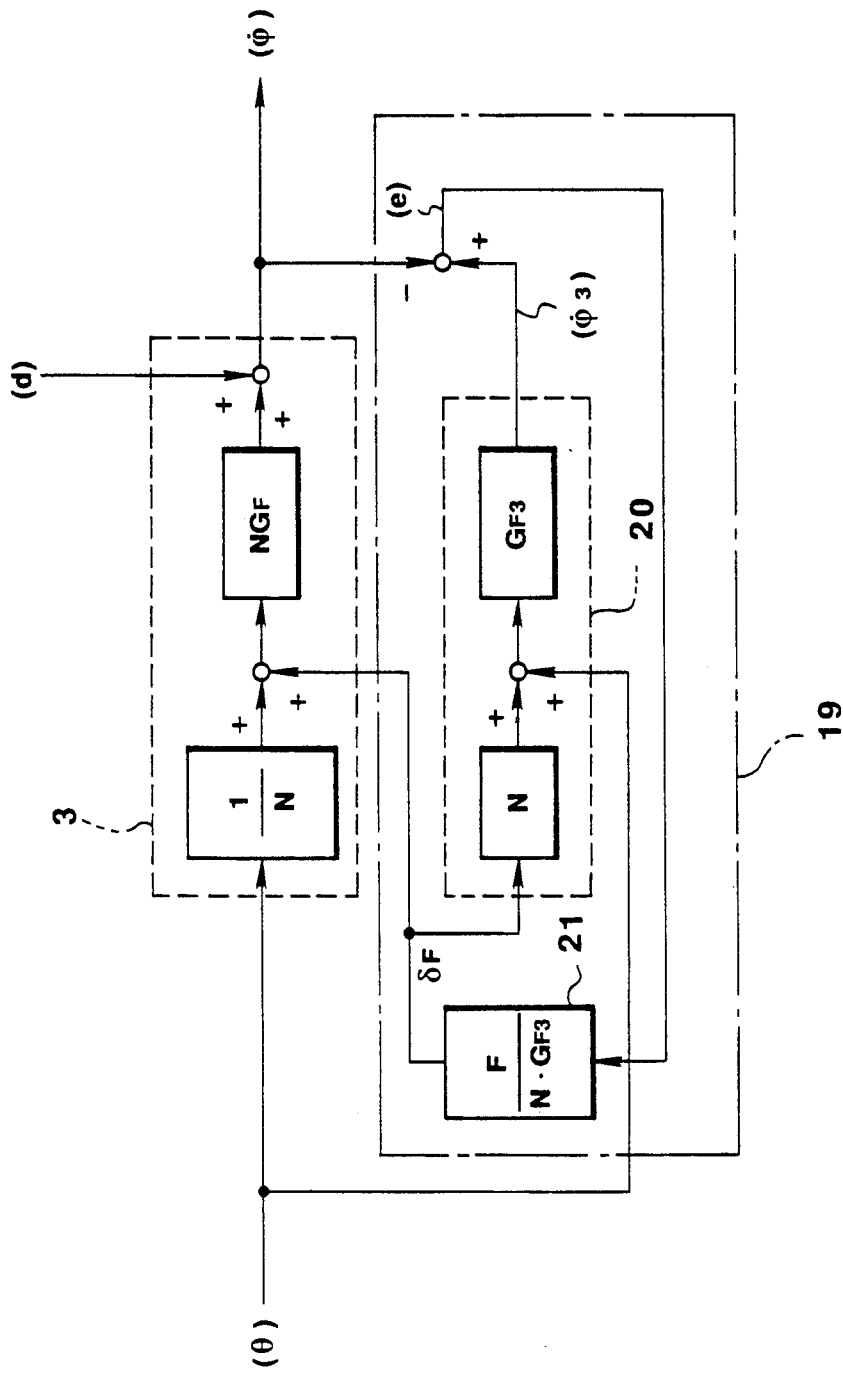
FIG. 6 is a block diagram for showing transfer characteristics of the second embodiment.

A second embodiment of the present invention is shown in FIGS. 5 and 6. As shown in FIG. 5, a vehicle motion control system of the second embodiment is designed to control the vehicle response with a front wheel auxiliary steering actuator 14 instead of the rear wheel steering actuator of the first embodiment. In the second embodiment, the actual front wheel steer angle of a controlled vehicle is a sum of equal to the primary front wheel steer angle (primary steering input), which is determined by the steering gear 2 in accordance with the angular displacement of the steering wheel 1, and an auxiliary front wheel steer angle $\delta F$ which is determined by a controller 15 and achieved by the front wheel steering actuator 14. The front wheel auxiliary steering actuator 14 steers the front wheels of the controlled vehicle in such a direction so as to increase or decrease the front wheel steer angle determined by the angular position of the steering wheel (away from or toward the straight ahead position of the front wheels). The controller 15 of the second embodiment has a front wheel auxiliary steer angle calculating circuit (or section) 15a, and a driver circuit (or section) for driving the front wheel auxiliary steering actuator 14.

As shown in FIG. 6, the controlled vehicle 3 receives the primary steering input in the form of the steering wheel angle $\theta$, and the control steering input in the form of the auxiliary front wheel steer angle $\delta R$, and produces the actual yaw rate $\dot{\phi}$. The primary front wheel steer angle is proportional to the steering wheel angle (or driver's steering command). When a steering gear ratio of the steering gear 2 is N, the primary front wheel steer angle is equal to $\theta/N$. The front wheel auxiliary steering actuator 14 moves a movable element of the front steering mechanism, and by so doing, makes the actual front whee, steer angle equal to the sum of the primary front wheel steer angle $O/N$ and the auxiliary front wheel steer angle $\delta F$. In response to this total steering input to the vehicle, the vehicle 3 produces the actual yaw rate $\phi$ which is determined by its own transfer characteristic N·GF between the front, wheel steer angle and vehicle yaw rate. The actual yaw rate $\phi$ is influenced by the disturbance d and a change in the $(\theta - \phi)$ transfer characteristic GF of the controlled vehicle. An auxiliary front wheel steer angle controlling system 19 of the second embodiment, however, minimizes this undesired influence by controlling the front wheel auxiliary steer angle, as follows. A vehicle motion estimating section 20 of the controlling system 19 calculates an estimated (or desired) yaw rate $\phi 3 = GF3(N \cdot \delta F + \theta)$ from a sum of a calculated steering angle N·$\delta$F correspondifig to the auxiliary front wheel steer angle $\delta F$, and the sensed steering angle $\theta$. Therefore, the motion estimating section 20 comprises a multiplying means for receiving a control signal representing the auxiliary front wheel steer angle $\delta F$, and producing an output signal representing the product obtained by multiplying the auxiliary front wheel steer angle $\delta F$ by the steering ratio N, an adding means for determining the sum of N·$\delta$F and $\theta$, and a function generating means for producing an estimated yaw rate signal representing the estimated yaw rate $\phi 3$ corresponding to the sum N·$\delta F+\theta$. The auxiliary front wheel steer angle controlling system 19 further comprises a comparing (deviation detecting) means for comparing the actual yaw rate $\phi$ sensed by the yaw rate sensor 8 with the estimated yaw rate $\phi 3$, and produces a deviation (or error) signal representing the deviation e of the actual yaw rate $\phi$ from the estimated yaw rate $\phi 3$.

An auxiliary front wheel steer angle controlling section 21(serving as the feedback compensating means) of the controlling system 19 receives the deviation signal, and determines the auxiliary front wheel steer angle 5F by using the following equation.

$$\delta F = \frac{F}{N \cdot GF3} e$$

The transfer characteristic of the controlling section 21 is determined in the same mannner as in the first embodiment. The controlling section 21 produces the control signal representing the thus-determined auxiliary front wheel steer angle $\beta F$, and sends the control signal to the steering actuator 14.

In this way, the control system can also achieve the vehicle handling characteristic which is aimed at by the transfer characteristic GF3, without requiring troublesome tuning operations, and without being receiving undesired influences from disturbances.

Figure 7:
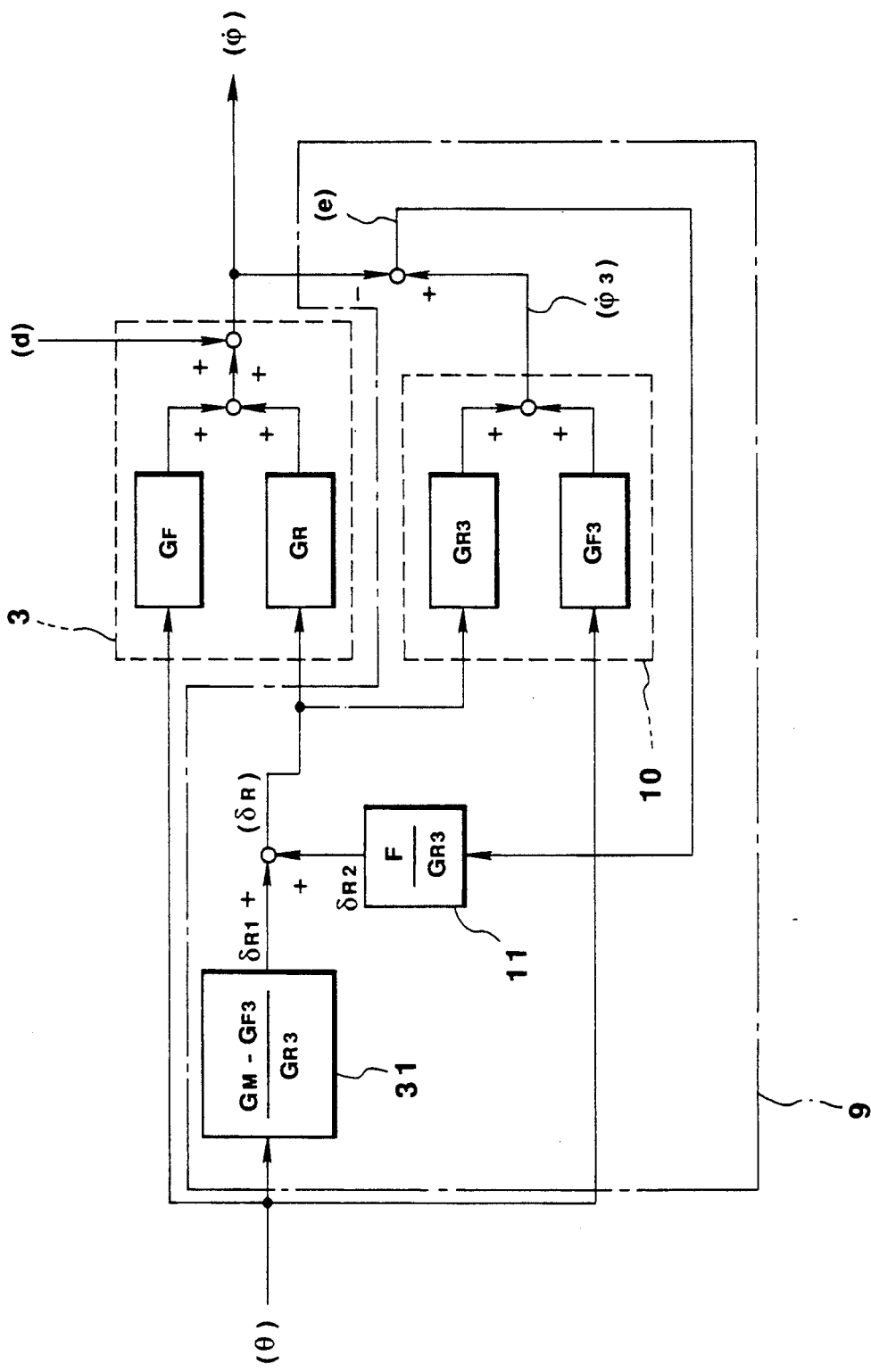
FIG. 7 is a block diagram showing a control system according to a third embodiment of the present invention.
Figure 8:
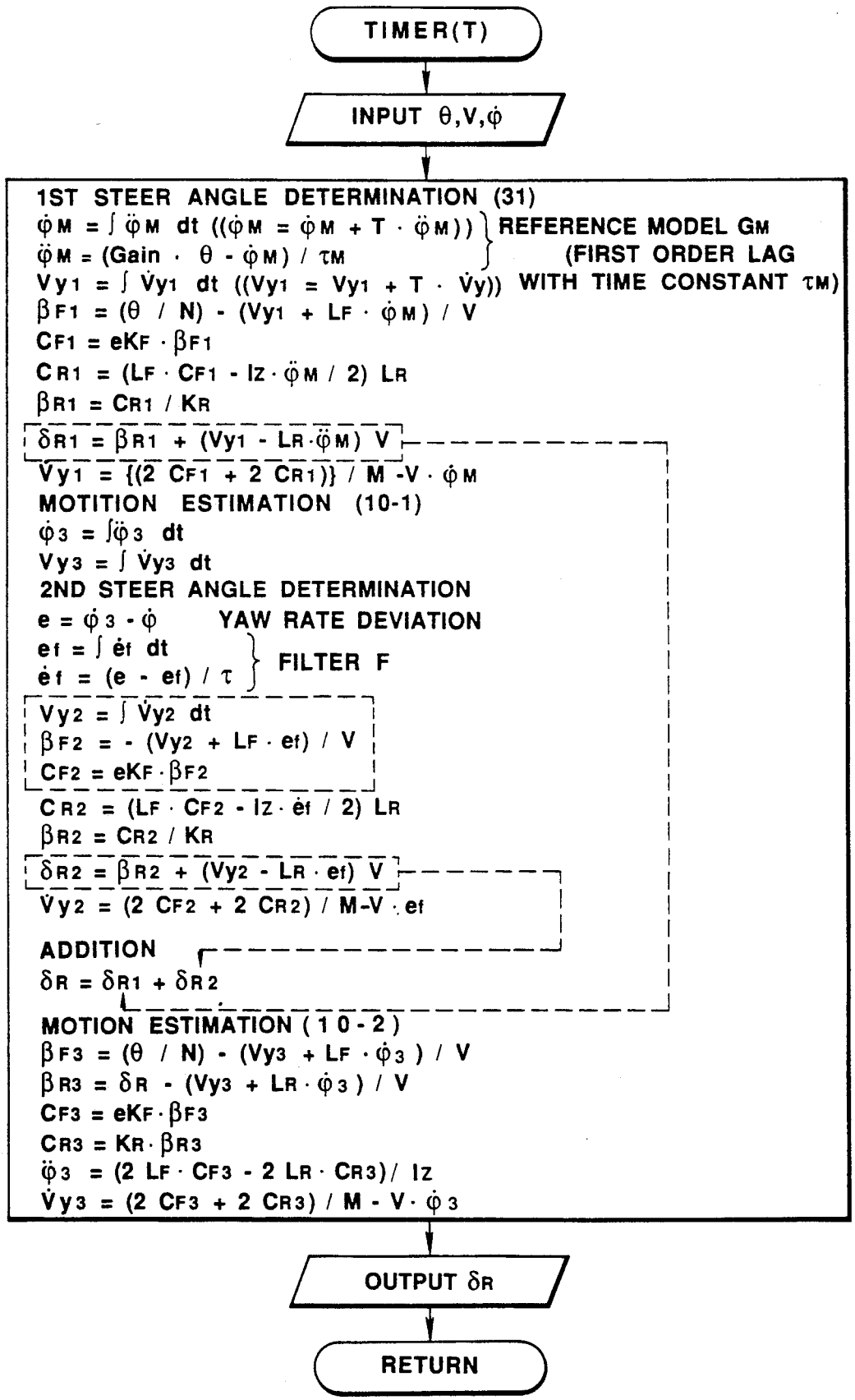
FIG. 8 is a flowchart showing a control program of the third embodiment.

A third embodiment is shown in FIGS. 7 and 8. A vehicle motion control system of the third embodiment comprises components shown in FIG. 1, like the system of the first embodiment. As shown in FIG. 7, the control system of the third embodiment comprises a first rear wheel steer angle controlling section 31 for feedforward compensation, a second rear wheel steer angle controlling section 11 for feedback compensation, and a means for adding first and second output signals of the feedforward controlling section 31 and the feedback controlling section 11, and producing a control signal representing the resulting sum. The motion estimating section 10 and the feedback controlling section 11 of the third embodiment are substantially identical to those of the first embodiment. The control signal of the third embodi a control rear wheel steer angle $\delta R$ which is equal to the sum of the first rear wheel steer angle $\beta R1$ (a first auxiliary steering amount) determined by the feedforward controlling section 31, and the second rear wheel steer angle $\delta R2$ determined by the feedback controlling section 11.

The feedforward controlling section 31 of the third embodiment determines the first rear wheel steer angle $\delta R1$ according to a model matching control method similar to the control method disclosed in the section "3.1 Model Matching Control of Yaw Rate" of "A New Way of Controlling a Four Wheel Steering Vehicle" by Ken Ito et al. which appeared in Keisokujidoseigyogakkai Ronbunshu, Vol. 23, No. 8. The explanation of this document is herein incorporated by reference.

The feedforward controlling section 31 determines the first rear wheel steer angle $\delta R1$ by using the following relationship.

$$\delta R1 = \frac{GM - GF3}{GR3} \theta$$

In this equation, GM is a reference model which is determined arbitrarily by a designer of the control system. The reference model GM is a desired transfer characteristic for determining a desired yaw rate corresponding to the steering angle $\theta$. The control system places the control steering input which is the sum of the first rear wheel steer angle $\delta R1$ and the second rear wheel steer angle $\delta R2$ upon a movable element of the rear wheel steering mechanism of the vehicle.

The yaw rate $\phi$ of the controlled vehicle, corresponding to the primary steering input $\theta$, the auxiliary steering input $\delta R$ and the disturbance input d is given by the transfer characteristic of the equation (1). The desired yaw rate characteristic of the desired yaw rate corresponding to the steering angle $\theta$ and the rear wheel steer $\delta R$ is given by the equation (4). A characteristic of a desired yaw rate corresponding to the steering angle $\theta$ according to the reference model GM is given by the folidwing equation (11).

$$\phi M(t) = GM(S, V) \theta(t) \quad (11)$$

When the controlling gistem 9 is constructed as shown in FIG. 7, the vehicle yaw rate transfer characteristic is given by the equation (3), and the yaw rate deviation e is given by the equation (5). The rear wheel steer angle $\delta R$ is given by;

$$\delta R = \frac{GM - GF3}{GR3} \theta + \frac{F}{GR3} e \quad (12)$$

Substitution of the equation (5) into the equation (12) and rearrangement gives;.

$$\delta R = \frac{\{GM - (1 - F)GF3\}\theta - F\phi}{(1 - F)GR3} \quad (13)$$

Substitution of the equation (13) into the equation (3) and rearrangement gives;

$$\dot{\phi} = \frac{GMGR + (1 - F)GR3GF - (1 - F)GR3GR}{(1 - F)GR3 + FGR} \theta + \quad (14)$$

$$\frac{(1 - F)GR3}{(1 - F)GR3 + FGR} d$$

If GF and GR deviate, respectively, from GF3 and GR3 by ΔGF and ΔGR, so that GF=GF3+ΔGF and GR=GR3+ΔGR, and the filter characteristic deviates by ΔF=1−F, then the equation (14) can be rewritten as:

$$\dot{\phi} = \left[ \frac{GF3GR}{GR} + \frac{\Delta F(\Delta GFGR - \Delta GRGF)}{-\Delta F\Delta GR} \right] \theta + \quad (15)$$

$$\frac{\Delta FGR + \Delta F\Delta GR}{GR - \Delta F\Delta GR} d$$

As evident from the equation (15), the control system of this embodiment can achieve the following advantageous effects.

(i) The control performance is stable and immutable to parameter changes (assuming d=0).

When ΔF is small, and F is close to one, the yaw rate $\dot{\phi}$ equal to GMθ, as seen from the first term of the right member of the equation (15). Therefore, the actual yaw rate $\dot{\phi}$ is independent from the parameters GF and GR, and immune to changes in these parameters. As a result, the control system of this embodiment can always provide an intended stable handling performance determined by the reference model GM without need for time-consuming tuning operations.

(ii) The control performance is resistant to disturbances (assuming θ=0).

As seen from the second term of the right member of the equation (15), the yaw rate $\dot{\phi}$ is equal to ΔF·d if ΔGF=0 (GF=GF3) and ΔGR=0 (GR=GR3). Therefore, if ΔF is sufficiently small, the control system can reduce the influence of the disturbance d almost to zero, and prevent the handling performance of the vehicle from deviating from the desired goal of the control system. Even if ΔGF≠0 and ΔGR≠0, the control system can reduce $\dot{\phi}$ near zero as long as ΔF is small.

The controller 5 of the third embodiment controls the rear wheel steer angle by performing a rear wheel steer angle control program shown in FIG. 8 in an interrupt handling mode each time a predetermined time interval T elapses. In addition to the mathematical operations of the control program shown in FIG. 3, the control program of FIG. 8 further includes mathematical operation of the first controlling section 31, and a mathematical operation of the adding means. In FIG. 8, the rear wheel steer angle determined by the controlling section 11 is treated as the second rear wheel steer angle δR2.

After reading the current values of the steering wheel angle θ, the vehicle speed V and the yaw rate $\dot{\phi}$, the first controlling section 31 determines a target yaw acceleration $\ddot{\phi}M$ corresponding to the steering angle θ, by using the reference mathematical model GM (which is a system of a first order lag having a time constant τM). The target yaw acceleration $\ddot{\phi}M$ is given by $\ddot{\phi}M = (Gain·\theta - \dot{\phi})/\tau M$. The section 31 further determines a target yaw rate $\dot{\phi}M$ by integrating the target yaw acceleration $\ddot{\phi}M$. The section 31 uses the approximate integration given by; $\dot{\phi}M = \dot{\phi}M + T·\ddot{\phi}M$ Then, the section 31 determines the first (feedforward control) rear wheel steer angle δR1 in accordance with a set of known equations of vehicle motion. In this embodiment, the section 31 first determines a front wheel (side) slip angle βF1 from a side speed Vy1 and the above-mentioned target yaw rate $\dot{\phi}M$ by using the following equation.

$$\delta F1 = \theta/N - (Vy1 + LF·\dot{\phi}M)/V$$

The side speed Vy1 is obtained by the approximate integration of a side acceleration $\dot{V}y1$ by using a previous value of the side acceleration determined in the last control cycle. That is, $Vy1 = Vy1 + T·\dot{V}y$. From the thus-obtained front wheel slip angle βF1, the controlling section 31 determines a front wheel cornering force CF1 by using the following equation.

$$CF1 = eKF·\beta F1$$

In this way, the controller 5 estimates the cornering force produced by the front wheels due to correction. Then, the section 31 determines a rear wheel cornering force CR1 which is required to produce the above-mentioned target yaw acceleration $\ddot{\phi}M$ when this front wheel cornering force CF1 is acting, by using the following equation.

$$CR1 = (LF·CF1 - IZ·\ddot{\phi}M/2)/LR$$

Then, the section 31 determines a rear wheel slip angle βR1 to obtain this cornering force CR1, by a mathematical operation in a reverse direction.

$$\beta R1 = CR1/Kr$$

From this rear wheel slip angle βR1, the section 31 determines the first rear wheel steer angle δR1 according to the following equation.

$$\delta R1 = \beta R1 + (Vy1 - LR·\dot{\phi}M)/V$$

Then, the controller 5 determines the side acceleration $\dot{V}$ to be used in the next control cycle, by using the following equation.

$$\dot{V}y1 = \frac{(2CF1 + 2CR1)}{M} - V·\dot{\phi}M$$

In this equation, M is a vehicle mass.

Then, the controller 5 determines the second rear wheel steer angle βR2 by performing the mathematical operations of the motion estimating section 10 and the steer angle controlling section 11 in the same manner as in the first embodiment shown in FIG. 3.

Then, the controller 5 determines the (final) rear wheel steer angle δR by adding the first and second rear wheel steer angles δR1 and δR2. This operation corresponds to the adding means for determining the (final) rear wheel steer angle. That is; δR=δR1+δR2. Then, the controller 5 performs the remaining mathematical operations of the motion estimating section (10-2) in the same manner as in the first embodiment. Finally, the controller 5 produces the control signal representing the thus-determined rear wheel steer angle δF3, and sends the control signal to the rear wheel steering actuator 4. In response to the control signal, the rear wheel steering actuator 4 steers the rear wheels of the controlled vehicle so that the actual rear wheel steer angle is made equal to the sum of the first and second rear wheel steer angles.

Figure 9A:
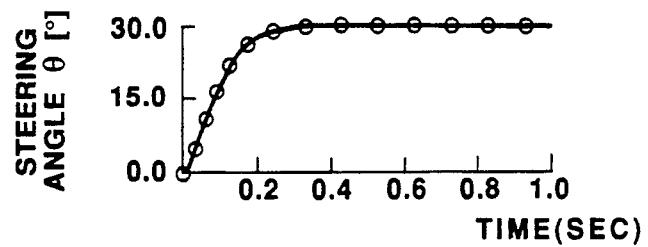
FIGS. 9A–9D are graphs for illustrating effects of the control system of the third embodiment.
Figure 9B:
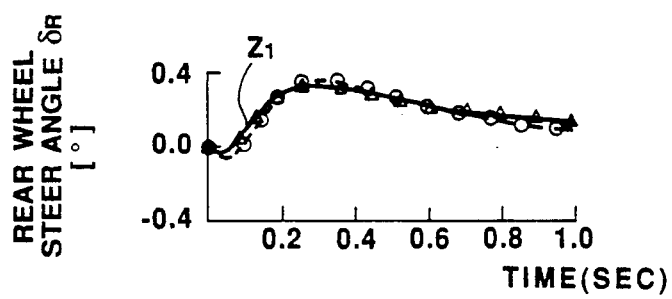
Figure 9C:
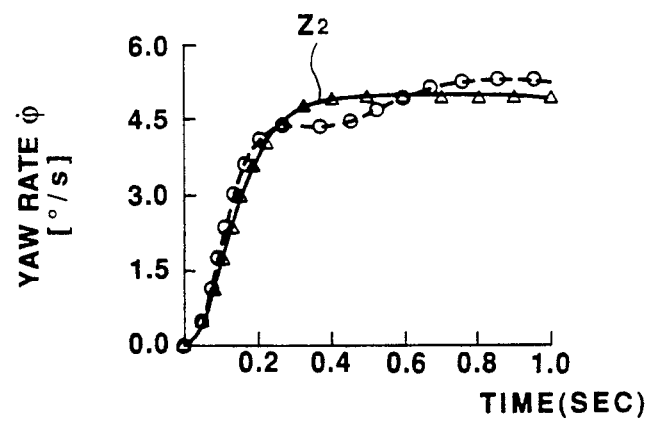
Figure 9D:
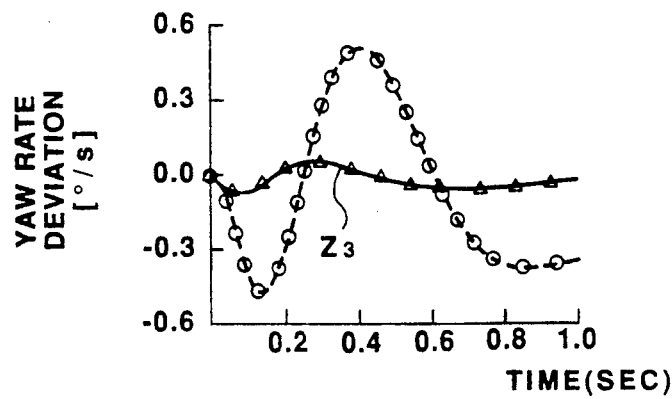

Therefore, the control system of the third embodiment can minimize undesired influences of the disturbance like the control system of the first embodiment, as shown in FIGS. 4A-4E Furthermore, the control system of the third embodiment can improve the vehicle response characteristic as seen from the results of a simulation shown in FIGS. 9A-9D. When the steering wheel angle $\theta$ is varied as shown in FIG. 9A, the model matching control system of the above-mentioned document yields characteristics of the rear wheel steer angle, the yaw rate, and the deviation of the yaw rate from the target yaw rate determined by the reference model GM, as shown by broken lines in FIGS. 9B, 9C and 9D. In contrast to these characteristics, the control system of the third embodiment can improve the characteristics as shown by lines Z1, Z2 and Z3 in FIGS. 9B,9C and 9D.

In the third embodiment, the feedforward first controlling section 31 is designed to control the yaw rate. That is, the yaw rate is the controlled variable. However, it is possible to arrange the feedforward section 31 so as to obtain a desired response of the side acceleration (or the lateral acceleration) of the vehicle, or a desired response of a linear combination of the yaw rate and the side acceleration.

Figure 10:
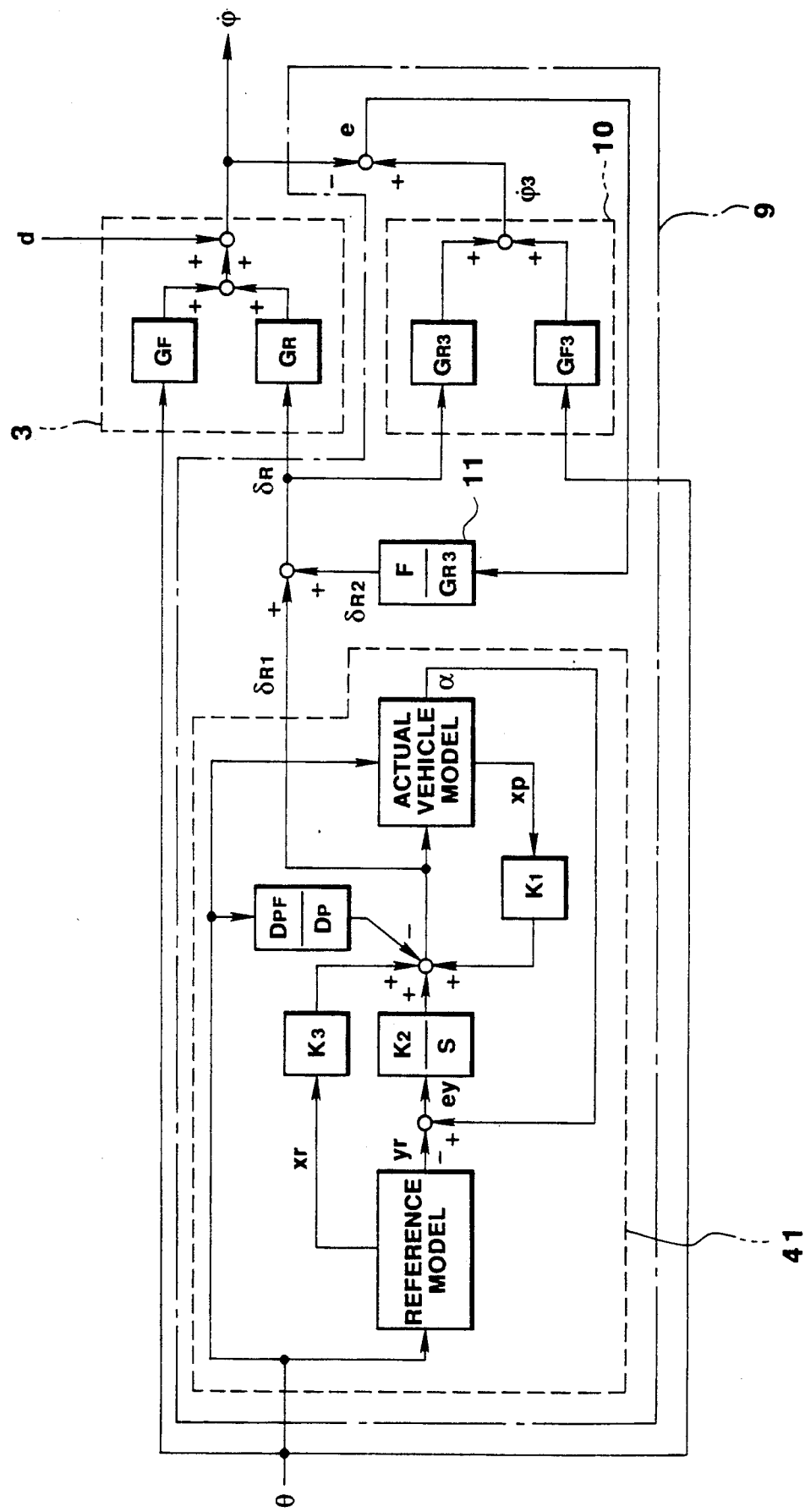
FIG. 10 is a block diagram showing a control system according to a fourth embodiment of the present invention.

A fourth embodiment of the present invention is shown in FIG. 10. In a vehicle motion control system of the fourth embodiment, the feedforward controlling section 31 of the third embodiment is replaced by a feedforward first controlling section 41 which is designed to perform a control process similar to a lateral acceleration model following the control process disclosed in the section, "3.3 Lateral Acceleration Model Following Control", of the above-mentioned document by Ken Ito et al. The feedforward controlling section 41 determines a target side (or lateral) acceleration yr corresponding to the steering angle $\theta$ by using a reference model, and further determines an estimated side (or lateral) acceleration $\alpha$ corresponding to the first rear wheel steer angle $\delta R1$ and the steering angle $\theta$ by using an actual vehicle model simulating the controlled vehicle. Then, the feedforward controlling section 41 determines a deviation of the estimated side acceleration a from the target side acceleration yr, and determines the first rear wheel steer angle $\delta R1$ so as to reduce this deviation. The feedforward controlling section 41 may be designed to determine the rear wheel steer angle so as to control both the yaw rate and side acceleration in accordance with the section, "3.3 D* Model Following Control", of the above-mention document by Ken Ito et al. A U.S. Pat. No. 4,840,389 also discloses similar feedforward control processes. The disclosures of the above-mentioned document by Ken Ito et al, and this U. S. Patent are herein incorporated by reference. In the present invention, it is possible to employ two different controlled variables. For example, the feedforward section 41 (or 31) is arranged to determine the first steer angle so as to control the first controlled vehicle motion variable such as the side (lateral) acceleration whereas the feedback controlling section 11 is arranged to determine the second steer angle so as to control the second controlled vehicle motion variable such as the yaw rate. In any case, the control system according to the present invention can always provide a desired cornering performance notwithstanding disturbances and changes in the characteristics of the controlled vehicle.

Figure 11:
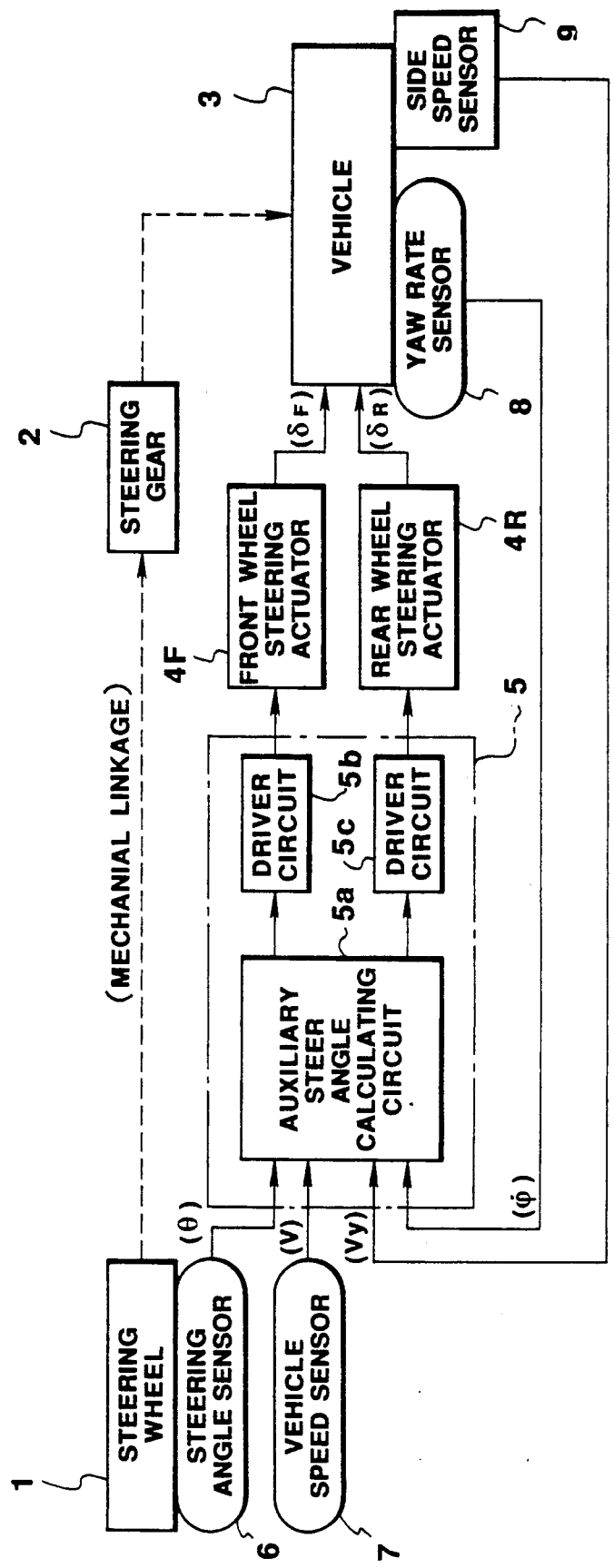
FIG. 11 is a block diagram showing a control system according to a fifth embodiment of the present invention.
Figure 12:
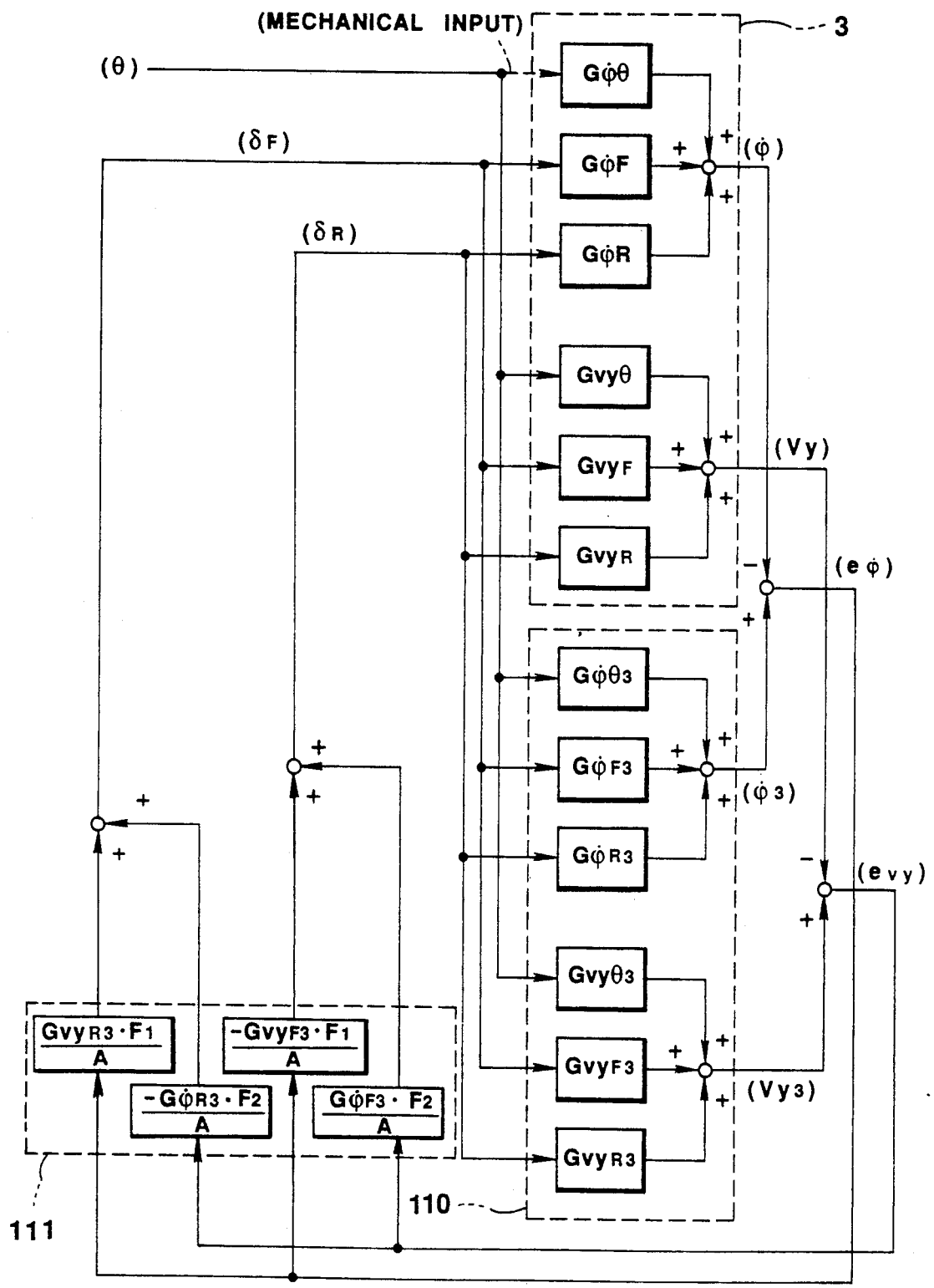
FIGS. 12 and 13 are block diagrams showing the control system of the fifth embodiment in terms of transfer characteristics.
Figure 13:
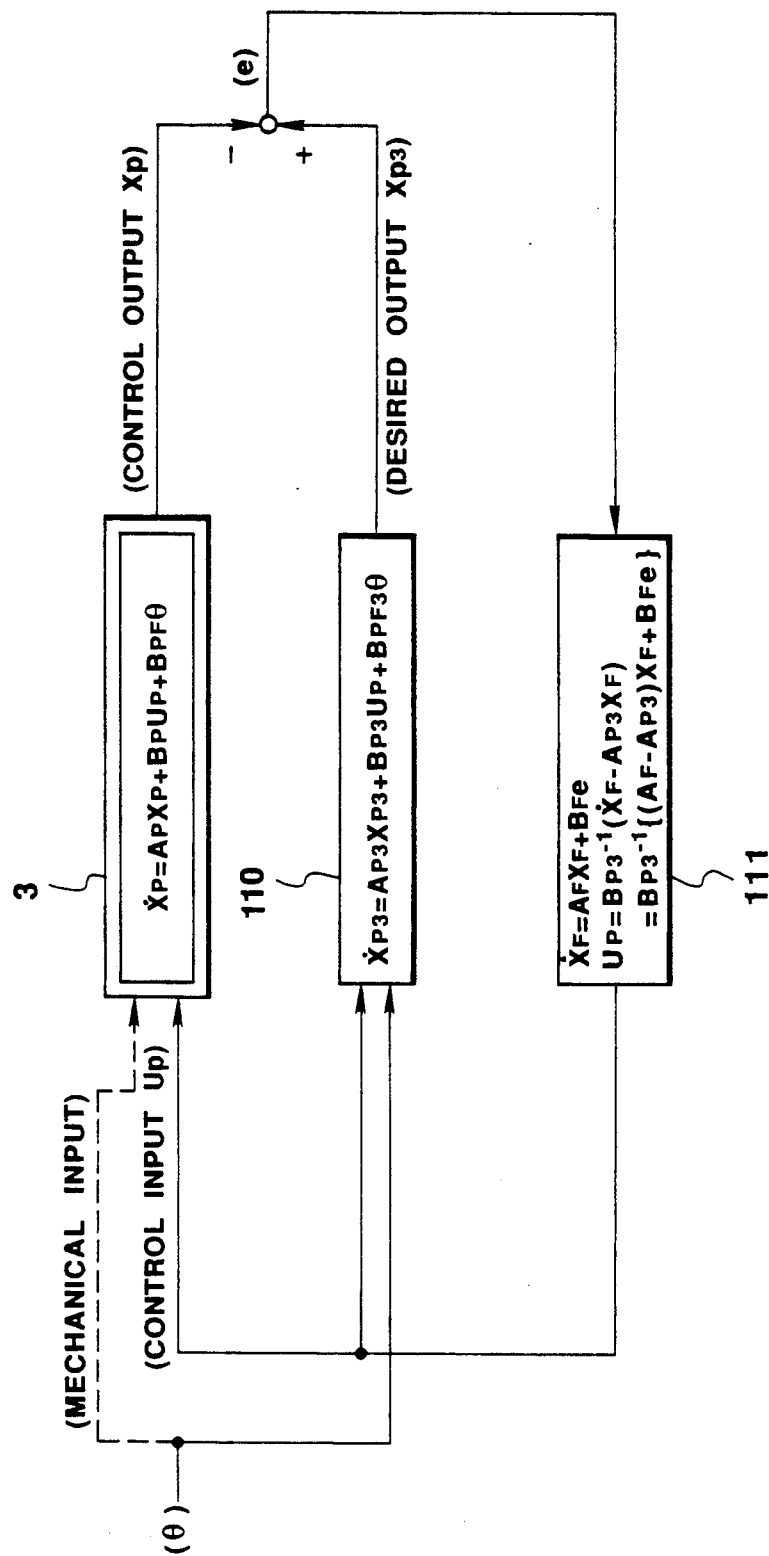

A fifth embodiment of the present invention is shown in FIGS. 11-14. FIG. 11 shows the hardware structure of a vehicle motion control system according to the fifth embodiment. FIGS. 12 and 13 show arrangements of transfer characteristics employed in the fifth embodiment. FIG. 14 shows a control program of the fifth embodiment.

As shown in FIG. 11, the control system of the fifth embodiment for controlling a vehicle 3 includes the components 1, 2, 6, 7 and 8 like the control system of the first embodiment shown in FIG. 1. The control system of the fifth embodiment further includes a front wheel auxiliary steering actuator 4F, a rear wheel auxiliary steering actuator 4R, a controller 51 and a side speed sensor 9. The controller 5 of the fifth embodiment has an auxiliary steer angle calculating circuit (or section) 5a for determining both an auxiliary front wheel steer angle. $\delta F$ and an auxiliary rear wheel steer angle $\delta R$, and two driver circuits 5b and 5c for driving the front wheel steering actuator 4F and the rear wheel steering actuator 4R. The side speed sensor 9 senses a side (or lateral) speed of the controlled vehicle 3. For example, the side speed sensor 9 is an optical type sensor which can directly sense a ground speed of the vehicle. Alternatively, it is possible to determine the side speed from the output of a lateral acceleration sensor and/or the output of the yaw rate sensor.

The auxiliary steer angle calculating circuit 5a of the controller 5 receives the sensor output signals, respectively, representing the steering wheel angle $\theta$ sensed by the steering angle sensor 6, the vehicle speed V sensed by the vehicle speed sensor 7, the yaw rate $\dot{\phi}$ sensed by the yaw rate sensor 8, and the side speed Vy sensed by the side speed sensor 9. The controller 5 of the fifth embodiment processes these sensor signals, and produces a front wheel steer angle control signal representing the auxiliary front wheel steer angle $\delta F$ and a rear wheel steer angle control signal representing the auxiliary rear wheel steer angle $\delta R$. The front wheel auxiliary steering actuator 4F receives the front wheel steer angle control signal from the controller 5, and steers the front wheels in accordance with the auxiliary front wheel steer angle in such an auxiliary manner that the auxiliary steering input is added to the primary steering input of the steering gear 2. The rear wheel auxiliary steering actuator 4R steers the rear wheels of the controlled vehicle in response to the rear wheel steer angle control signal sent from the controller 5.

As shown in FIG. 12, the controlled vehicle (or plant) 3 produces the actual vehicle yaw rate $\dot{\phi}$ which can be regarded as a sum of first, second and third terms. The first term is a yaw rate resulting from the primary steering input $\theta$, and determined by a $(\theta - \dot{\phi})$ transfer characteristic $G\phi\theta$ of the controlled vehicle between the steering wheel angle and the yaw rate. The second term is a yaw rate resulting from the auxiliary steering input in the form of the auxiliary front wheel steer angle $\delta F$, and this second yaw rate term is determined by a $(\delta F - \dot{\phi})$ transfer characteristic $G\phi F$ of the controlled vehicle between the auxiliary front wheel steer angle fiF and the vehicle yaw rate. The third term is a yaw rate which is a result of the auxiliary rear wheel steer angle $\delta R$ and which is determined by, a $(\delta R - \dot{\phi})$ transfer characteristic $G\phi R$ of the controlled vehicle. The controlled vehicle 3 further produces the actual vehicle side speed Vy which is also a sum of first, second and third terms. The first side speed term is a side speed resulting from the primary steering input $\theta$, and determined from $\theta$ by a $(\theta - Vy)$ transfer characteristic $GVy\theta$ the controlled vehicle 3. The second side speed term is a vehicle side speed which is a result of the auxiliary front wheel steering angle δF, and which is determined from δF by (δF−Vy) transfer characteristic GVyF of the controlled vehicle. The third side speed term is a vehicle side speed response resulting from the auxiliary rear wheel steer angle δR, which is determined from δR by a (δR−Vy) transfer characteristic GVyR of the controlled vehicle 3.

The vehicle motion estimating section 110 of the fifth embodiment is designed to estimate both a vehicle yawing motion and a vehicle side translational motion. The estimating section 110 determines a desired (or estimated) yaw rate $\dot{\phi}3$ corresponding to $\theta$, δF and δR by using a desired transfer characteristic G$\dot{\phi}\theta$3 of the desired yaw rate with respect to the primary steering input $\theta$, a desired transfer characteristic G$\dot{\phi}$F3 of the desired yaw rate with respect to the auxiliary front wheel steering input δF, and a desired transfer characteristic G$\dot{\phi}$R3 of the desire yaw rate with respect to the auxiliary rear wheel steering input δR. The desired yaw rate $\dot{\phi}3$ is a sum of a first desired yaw rate output determined from the primary steering input $\theta$ by G$\dot{\phi}\theta$3, a second desired yaw rate output determined from the auxiliary front steering input δF by G$\dot{\phi}$F3, and a third desired yaw rate output determined from the auxiliary rear steering input δR by G$\dot{\phi}$R3. The motion estimating section 10 further determines a desired (or estimated) side speed VY3 corresponding to $\theta$, δF and δR by using a desired transfer characteristic GVy$\theta$3 of the desired side speed with respect to the primary steering input $\theta$, a desired transfer characteristic GVyF3 of the desired side speed with respect to the auxiliary front wheel steering input δF, and a desired transfer characteristic GVyR3 of the desired side speed with respect to the auxiliary rear wheel steerin input εR. The desired side speed Vy3 is a sum of a first desired side speed output determined from $\theta$ by GVy$\theta$3, a second desired side speed output determined from δF by GVyF3 and a third desired side speed output determined from δR by GVyR3. It is possible to freely and arbitrarily choose each of these six desired transfer characteristics of the motion estimating section 10.

The controller 5 of the fifth embodiment further determines a yaw rate deviation (or error) e$\dot{\phi}$, and a side speed deviation (or error) evy. The controller 5 of the fifth embodiment serves as a means for comparing the actual yaw rate $\dot{\phi}$ with the desired yaw rate $\dot{\phi}3$ and determining the yaw rate deviation e$\dot{\phi}$ and a means for comparing the actual side speed Vy with the desired side speed Vy3 and determining the side speed deviation evy. The yaw rate deviation e$\dot{\phi}$ is given by; e$\dot{\phi}$=$\dot{\phi}3$−$\dot{\phi}$. The side speed deviation evy is given by; evy=Vy3−Vy.

The auxiliary steer angle controlling section 111 of the fifth embodiment receives the yaw rate deviation e$\dot{\phi}$ and the side speed deviation evy, and determines the auxiliary front and rear wheel steer angles δF and δR so as to reduce the yaw rate deviation e$\dot{\phi}$ and the side speed deviation evy. In the fifth embodiment, the controlling section 111 determines the auxiliary front and rear wheel steer angles δF and δR in accordance with Simultaneous equations expressed as;

$$F1e\dot{\phi} = G\dot{\phi}F3\delta F + G\dot{\phi}R3\delta R$$

$$F2evy = GvyF3\delta F + GvyR3\delta R$$

By solving these equation for δF and δR, we obtain $$\delta F = \frac{1}{G\dot{\phi}F3 \cdot GvyR3 - G\dot{\phi}R3 \cdot GvyF3} (GvyR3 \cdot F1e\dot{\phi} - G\dot{\phi}R3 \cdot F2evy)$$

$$\delta F = \frac{1}{G\dot{\phi}F3 \cdot GvyR3 - G\dot{\phi}R3 \cdot GvyF3} (-GvyR3 \cdot F1e\dot{\phi} - G\dot{\phi}R3 \cdot F2evy)$$

By using, G$\dot{\phi}$F3·GvyR3−G$\dot{\phi}$R3·GvyF3=A, the transfer characteristics used in the controlling section 111 of the fifth embodiment are expressed as; GvyR3·F1/A−G$\dot{\phi}$R3·F2/A, −GvyF3·F1/A and G$\dot{\phi}$F3·F2/A. In this way, the controlling section 111 uses a predetermined first filter transfer characteristic F1 for the yaw rate, and a predetermined second filter transfer characteristic F2 for the side speed. The controlling section 111 determines a first desired front wheel auxiliary steer angle from the yaw rate deviation by using the transfer characteristic GVyR3/A and the first filter transfer characteristic F1, and a second desired front wheel auxiliary steer angle from the side speed deviation by using the transfer characteristic −G$\dot{\phi}$R3/A and the second filter transfer characteristic F2. The controlling section 111 further determines a first desired rear wheel steer angle from the yaw rate deviation by using the transfer characteristic −GvyF3/A and the first filter transfer characteristic F1, and a second desired rear wheel steer angle from the side speed deviation by using the transfer characteristic G$\dot{\phi}$F3/A and the second filter transfer characteristic F2. Then, the controlling section 111 determines the auxiliary front wheel steer angle δF by adding the first and second desired front wheel steer angles, and the rear wheel steer angle δR by adding the first and second desired rear wheel steer angle, and sends the front wheel steer angle control signal representing the auxiliary front wheel steer angle δFto the front auxiliary steering actuator 4F, and the rear wheel steer angle control signal representing the auxiliary rear wheel steer angle δR to the rear auxiliary steering actuator 4R. The first and second filter transfer characteristics F1 and F2 are chosen in the same manner as in the filter transfer characteristic F of the first embodiment. The first filter transfer characteristic F1 is chosen so that the steady state gain (or stationary gain) of the first filter transfer F1 is one, and that the order difference resulting from subtraction of the order of a numerator of the first filter transfer characteristic F1 from the order of a denominator of the first filter transfer characteristic F1 is equal to or greater than the order difference resulting from subtraction of the order of a numerator of the desired estimator transfer characteristic G$\dot{\phi}$F3 from the order of a denominator of the desired estimator transfer characteristic G$\dot{\phi}$F3 for relating the desired yaw rate (first controlled variable) to the auxiliary front wheel steering input, and equal to or greater than the order difference resulting from subtraction of the order of a numerator of the desired estimator transfer characteristic G$\dot{\phi}$R3 from the order of a denominator of the desired estimator transfer characteristic G$\dot{\phi}$R3 for determining the desired yaw rate corresponding to the auxiliary rear wheel steer angle. Similarly, the steady state gain of the second filter transfer characteristic F2 is one, and the order difference of the second filter transfer characteristic F2 is equal to or greater than the order difference of the desired estimator transfer characteristic GVyF3 of the side slipping motion, and equal to or greater than the order difference of the desired estimator transfer characteristic GVyR3 of the side slipping motion. In this explanation, the order difference of a transfer characteristic is a difference obtained by subtracting the order of a numerator of the transfer characteristic from the order of a denominator of the transfer characteristic. When a two-degree-of-freedom linear mathematical simulation model relating to the yawing motion and the side translational motion is employed, each of the desired estimator transfer characteristics $G\phi F3$, $G\phi R3$, $BvyF3$, and $BvyR3$ is of the form of [first order]/[second order]. Therefore, in order to design the controlling system which requires no genuine differentiation, the first and second filter transfer characteristics F1 and F2 are preferably set as;

$$F1(s) = \frac{1}{1 + \tau 1s} = \frac{[\text{zero order}]}{[\text{first order}]}$$

$$F2(s) = \frac{1}{1 + \tau 2s} = \frac{[\text{zero order}]}{[\text{first order}]}$$

In these equations, s is an operator used in Laplace transformation (which is often called as a Laplace operator, or a differential operator or a complex frequency), and $\tau 1$ and $\tau 2$ are predetermined time constants.

FIG. 13 shows the control system of the fifth embodiment in a reduced form using matrix expressions. In FIG. 13, the control steering inputs (auxiliary steer angles), the control outputs (state variables) and the desired outputs are expressed in terms of matrices (or vectors), as follows:

$$Up^T = [\delta F, \delta R]$$

$$Xp^T = [\dot\phi, Vy]$$

$$XPe^S = [\dot\phi 3, Vy3]$$

In general, $A^T$ is the transpose of a matrix A. The transfer characteristics of the controlled vehicle 3 are expressed by the following equation (101)

$$\dot Xp = Ap(V)Xp + BpUp + BpF\theta \qquad (101)$$

In this equation Ap(V) is a system matrix of control constants (or coefficients) which are determined by the vehicle speed and vehicle data items, and each of Bp and BPF is a matrix of control constants (or coefficients) determined by vehicle data items. The vehicle (specification) data items of a vehicle are quantities which are treated as constants, and which are determined by the make of the vehicle. The vehicle mass M, wheel base, distances LF and LR, yawing moment of inertia Iz are some examples of the vehicle data items (which are sometimes called vehicle (constant) parameters). The estimated (or desired) behavior determined by the motion estimating section 110 is expressed by the following expression (102) which is obtained from the expression (101) by using the suffix "3" to denote the desired quantities of the motion estimating section 110.

$$\dot Xp3 = Ap3(V)Xp3 + Bp3Up + BpF3\theta \qquad (102)$$

When the well-known two-degree-of-freedom model of vehicle plane motion is employed, Ap3(V) is a 2×2 matrix, Bp3 is also a 2×2 matrix, and BpF3 is a 2×1 matrix.

The deviation e between the control output Xp and the desired output Xp3 is expressed as:

$$\left. \begin{array}{l} e^T = [e\dot\phi, eVy] \\ e\dot\phi = \dot\phi 3 - \dot\phi \\ eVy = Vy3 - Vy \end{array} \right\} \qquad (103)$$

The auxiliary steer angle controlling section 111 performs a filtering operation expressed by the following equation, to this deviation e.

$$\dot XF = AF \cdot XF + BF \cdot e \qquad (104)$$

When the two-degree-of-freedom linear model is employed, each of the control input to control output transfer characteristics is in the form of [first order]/[second order]. Therefore, in order to eliminate the necessity for pure differentiation, AF and $\beta F$ are determined as follows:

$$A_F = \begin{bmatrix} -\frac{1}{\tau 1} & 0 \\ 0 & -\frac{1}{\tau 2} \end{bmatrix} B_F = \begin{bmatrix} \frac{1}{\tau 1} & 0 \\ 0 & \frac{1}{\tau 2} \end{bmatrix}$$

In this case, the first filter transfer characteristic F1 for the yaw rate deviation, and the second filter transfer characteristic F2 for the side speed deviation are expressed as:

$$F1(s) = \frac{1}{1 + \tau 1s}$$

$$F2(s) = \frac{1}{1 + \tau 2s}$$

On the other hand, the control input Up is calculated, from the deviation e obtained by the equation (103) and the filter output XF obtained by the equation (104), as follows:

$$Up = Bp3^{-1}\{(Af - Ap3)Xf + BF \cdot e\} \qquad (105)$$

As explained above, the control system of the fifth embodiment shown in FIGS. 11–13 can minimize undesired influences from changes in thi characteristics of the vehicle and disturbance inputs, and always achieve the desired yaw rate and desired side speed determined by the desired transfer characteristics $G\phi\theta 3$, $G\phi F3$, $G\phi R3$, $Gvy\theta 3$, $GvyF3$, and $GvyR3$.

The controller 5 of the fifth embodiment periodically performs the control program shown in FIG. 14 by the interrupt handling routine at regular time intervals of a predetermined control cycle time T.

The controller 5 first reads current values of the steering wheel angle $\theta$, vehicle speed V, yaw rate $\dot\phi$ and side speed Vy which are sensed by the sensors 6–9, and then determines the front and rear wheel auxiliary steer angles $\delta F$ and $\delta R$ by processing the input data in the following manner.

The controller 5 determines the desired yaw rate $\dot\phi 3$ by integrating the desired yaw acceleration $\ddot\phi 3$, and the desired side speed Vy3 by integrating the desired side acceleration $\dot V3$. The controller 5 of the fifth embodiment uses the same approximate integration process as in the first embodiment.

$$\ddot{\phi}3 = \dot{\phi}3 + T\cdot\ddot{\phi}3$$

$$Vy3 = Vy3 + T\cdot\dot{V}y3$$

Then, the controller 5 determines the yaw rate deviation $e\dot{\phi} = \dot{\phi}3 - \dot{\phi}$ between the desired and sensed yaw rates, and the side speed deviation $evy = Vy3 - Vy$ between the desired and sensed side speeds. Then, the following fittering operations are performed to the yaw rate deviation $e\dot{\phi}$ and the side speed deviation $evy$.

$$ef\dot{\phi} = \int_0^t e\dot{f}\dot{\phi} \cdot dt$$

$$e\dot{f}\dot{\phi} = (e\dot{\phi} - ef\dot{\phi})/\tau 1$$

$$efVy = \int_0^t \dot{e}fVy \, dt$$

$$\dot{e}fVy = (eVy - efVy)/\tau 2$$

These filtering operations correspond to the following mathematical expressions.

$$ef\dot{\phi} = \frac{1}{1 + \tau 1 s} e\dot{\phi}$$

$$efVy = \frac{1}{1 + \tau 2 s} eVy$$

Then, the controller 5 determines a deviation ea expressed by the following equation.

$$3\alpha = efVy + v\cdot ef\dot{\phi}$$

Then, the controller 5 determines the auxiliary front and rear wheel steer angles δF and δR in accordance with the known equations of vehicle motion. First, the controller 5 determines the front wheel cornering force CF2 and rear wheel cornering force CR2 which are required to produce ea and $ef\dot{\phi}$, by using the deviations ea and $ef\dot{\phi}$, and predetermined values of the vehicle data items which are the vehicle mass M, the front wheel distance LF between the front wheel position and vehicle center of gravity, the rear wheel distance LR between the rear wheel position and the vehicle center of gravity, the wheelbase L and the yawing moment of inertia IZ. The front and rear wheel cornering forces CF2 and CR2 are expressed as;

$$CF2 = (M\cdot LR\cdot ea + IZ\cdot ef\dot{\phi})/2L$$

$$CR2 = (M\cdot LF\cdot ea - IZ\cdot ef\dot{\phi})/2L$$

Then, the controller 5 determines the front and rear wheel slip angles βF2 and βR2 to obtain these cornering force CF2 and CR2, by the following mathematical operations in the reverse direction.

$$\beta F2 = CF2/eKF$$

$$\beta R2 = CR2/Kr$$

In these equations, eKF is the front wheel equivalent cornering power, and KR is the rear wheel cornering power.

From these slip angles βF2 and βR2, the controller 5 determines the front and rear wheel auxiliary steer angles δF and δR according to the following equations.

$$\delta F = \beta F2 + (efVy + LF\cdot ef\dot{\phi})/V$$

$$\delta R = \beta R2 + (efVy - LR\cdot ef\dot{\phi})/V$$

Then, the controller 5 determines the desired yaw acceleration $\ddot{\phi}3$ and the desired side acceleration $\dot{V}y3$ for use in the next control cycle. First, the controller 5 determines the desired front wheel slip angle βF3 and the desired rear wheel slip angle βR3 by;

$$\beta F3 = (\theta/N) + \delta F - (Vy3 + LF\cdot\dot{\phi}3)/V$$

$$\beta R3 = \delta R - (Vy3 - LR\cdot\dot{\phi}3)/V$$

From these desired slip angles, the controller 5 determines the desired front wheel cornering force CF3 and the desired rear wheel cornering force CR3 which are given by;

$$CF3 = eKF\cdot\beta F3$$

$$CR3 = KR\cdot\beta R3$$

Finally, the controller 5 determines the desired yaw acceleration $\ddot{\phi}\beta$ and the desired side acceleration $\dot{V}y3$ for use in the next control cycle.

$$\ddot{\phi}3 = (2LF\cdot CF3 - 2LR\cdot CR3)/IZ$$

$$\dot{V}y3 = (2CF3 + 2CR3)/M - V\cdot\dot{\phi}3$$

Then, the controller 5 produces the front control signal representing the thus-determined front wheel auxiliary steer angle βF and the rear control signal representing the thus-determined rear wheel auxiliary steer angle βR, and controls the actual front and rear wheel steer angles by sending these control signals to the front and rear steering actuators 4F and 4R.

Figure 15A:
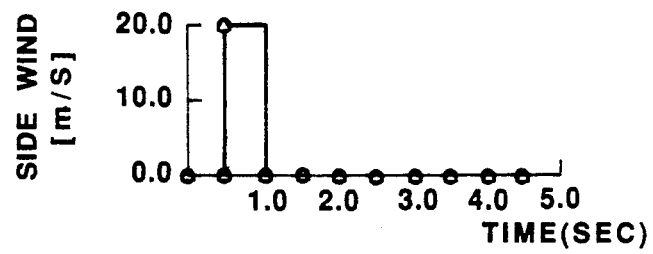
FIGS. 15A–15H are graphs showing effects of the control system of the fifth embodiment.
Figure 15B:
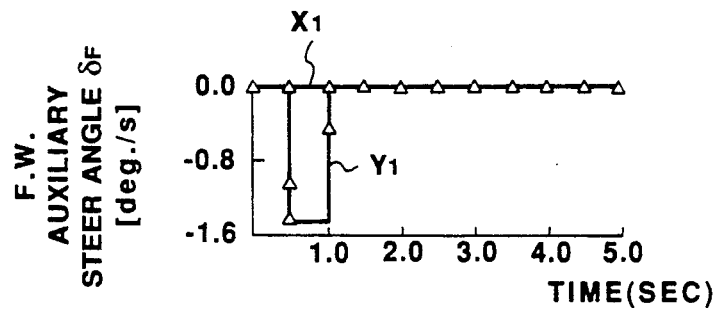
Figure 15C:
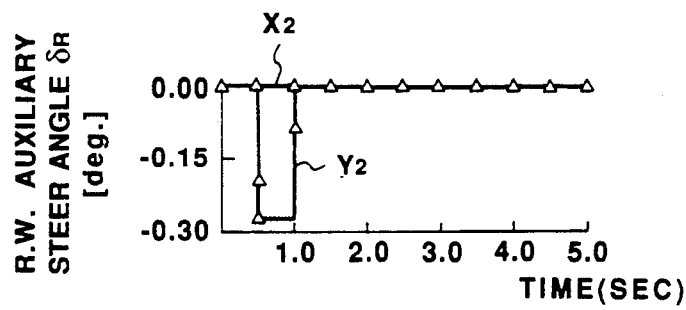
Figure 15D:
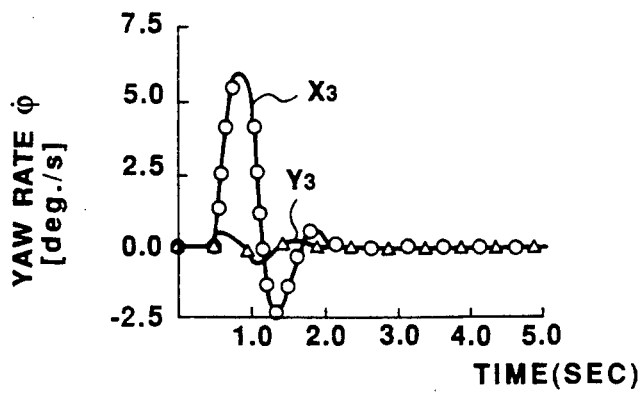
Figure 15E:
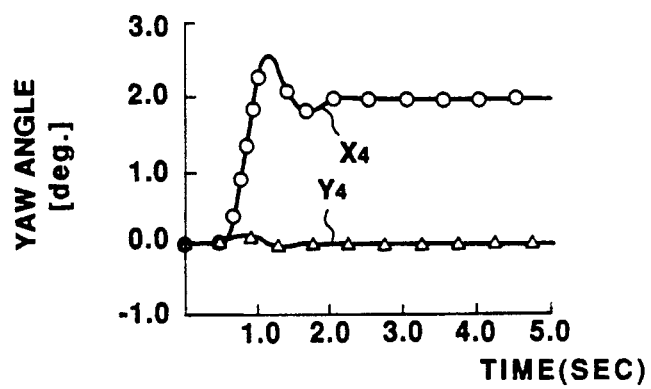
Figure 15F:
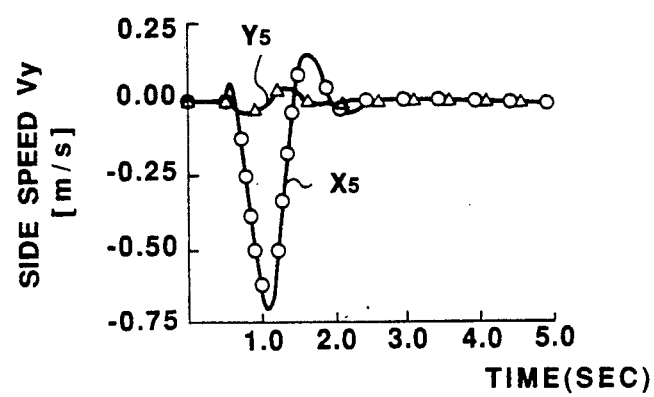
Figure 15G:
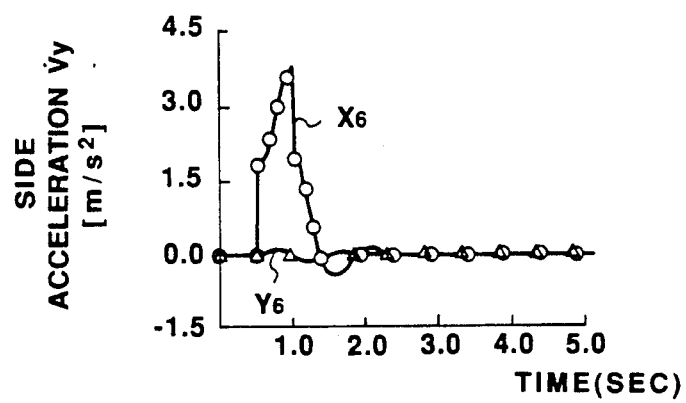
Figure 15H:
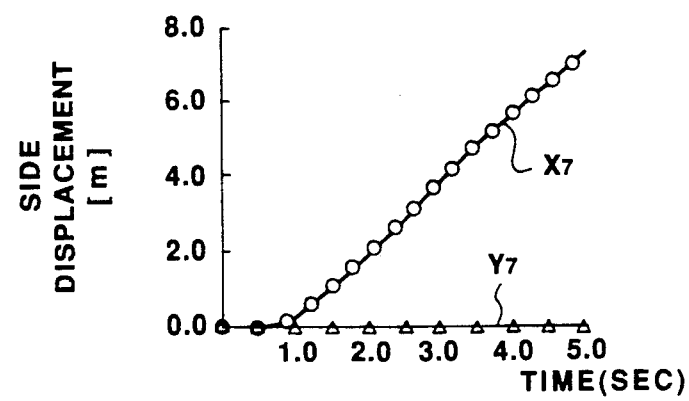

Therefore, the control system of the fifth embodiment can prevent variations of the vehicle characteristics G$\dot{\phi}\theta$, G$\dot{\phi}$F, G$\dot{\phi}$R, Gvyθ, GvyF and GvyFt from affecting the yaw rate $\dot{\phi}$ and the side speed Vy, and achieve the intended steering response of the vehicle without troublesome tuning operations. Furthermore, the vehicle controlled by the control system of the fifth embodiment is stable and resistant to disturbances. FIGS. 15A-15H show the results of a simulation. In the conventional steerind system, the front and rear wheel auxiliary steer angles δF and δR remain zero as shown by lines X1 and X2 in FIGS. 15B and 15C. Therefore, a disturbance due to side wind is applied to the vehicle as shown in FIG. 15A, then the yaw rate $\dot{\phi}$ the yaw angle $\phi$ the side speed Vy, the side acceleration V, and the side displacement are readily affected as shown by lines X3, X4, X5, X6 and X7 in FIGS. 15D-15H. In contrast to this unstable behavior of the conventional vehicle, the control system of the fifth embodiment can suppress the yaw rate, yaw angle, side speed, side acceleration and side displacement as shown by lines Y3, Y4, Y5, Y6 and Y7 in FIGS. 15D-15H by controlling the front and rear wheel auxiliary steer angles δF and δR as shown by lines Y1 and Y2 in FIGS. 15B and 15C.

Figure 16:
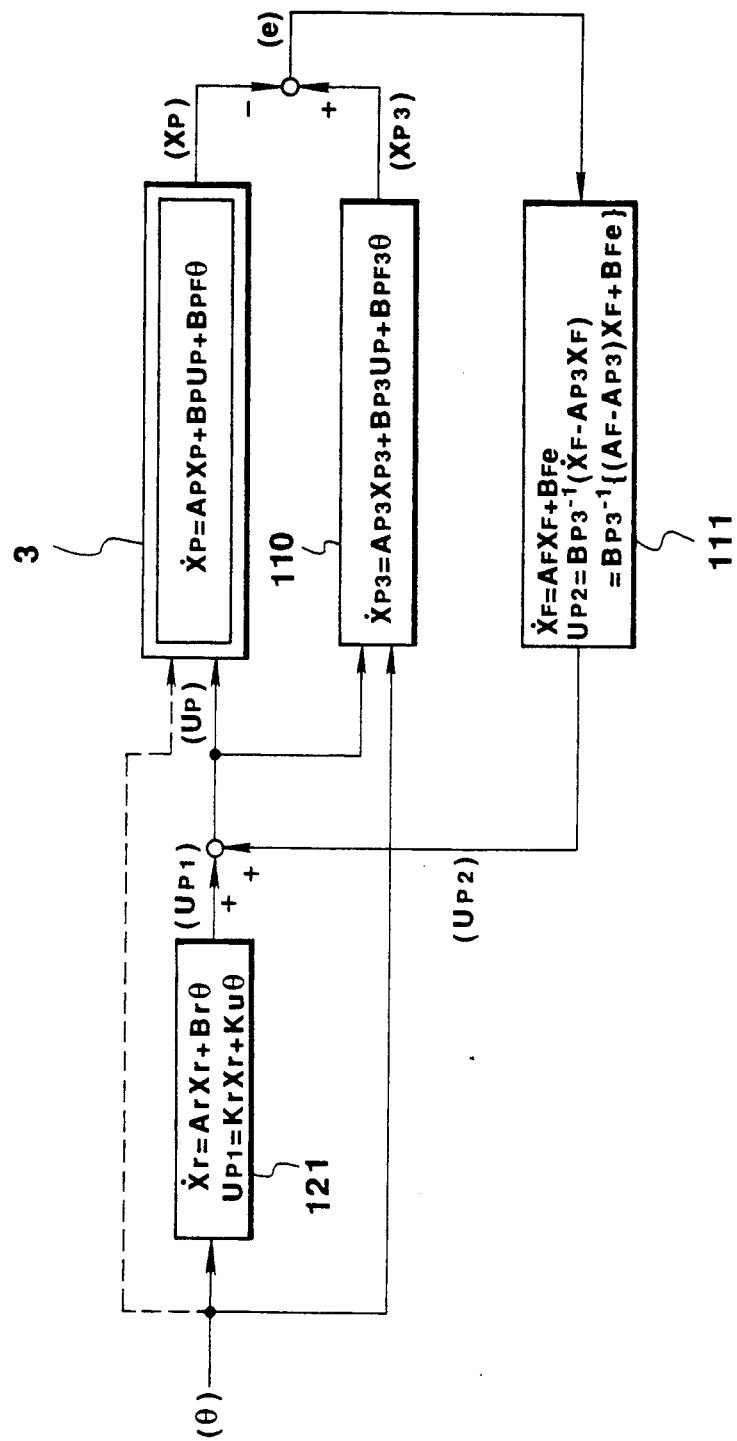
FIG. 16 is a block diagram showing a control system of a sixth embodiment.
Figure 17:
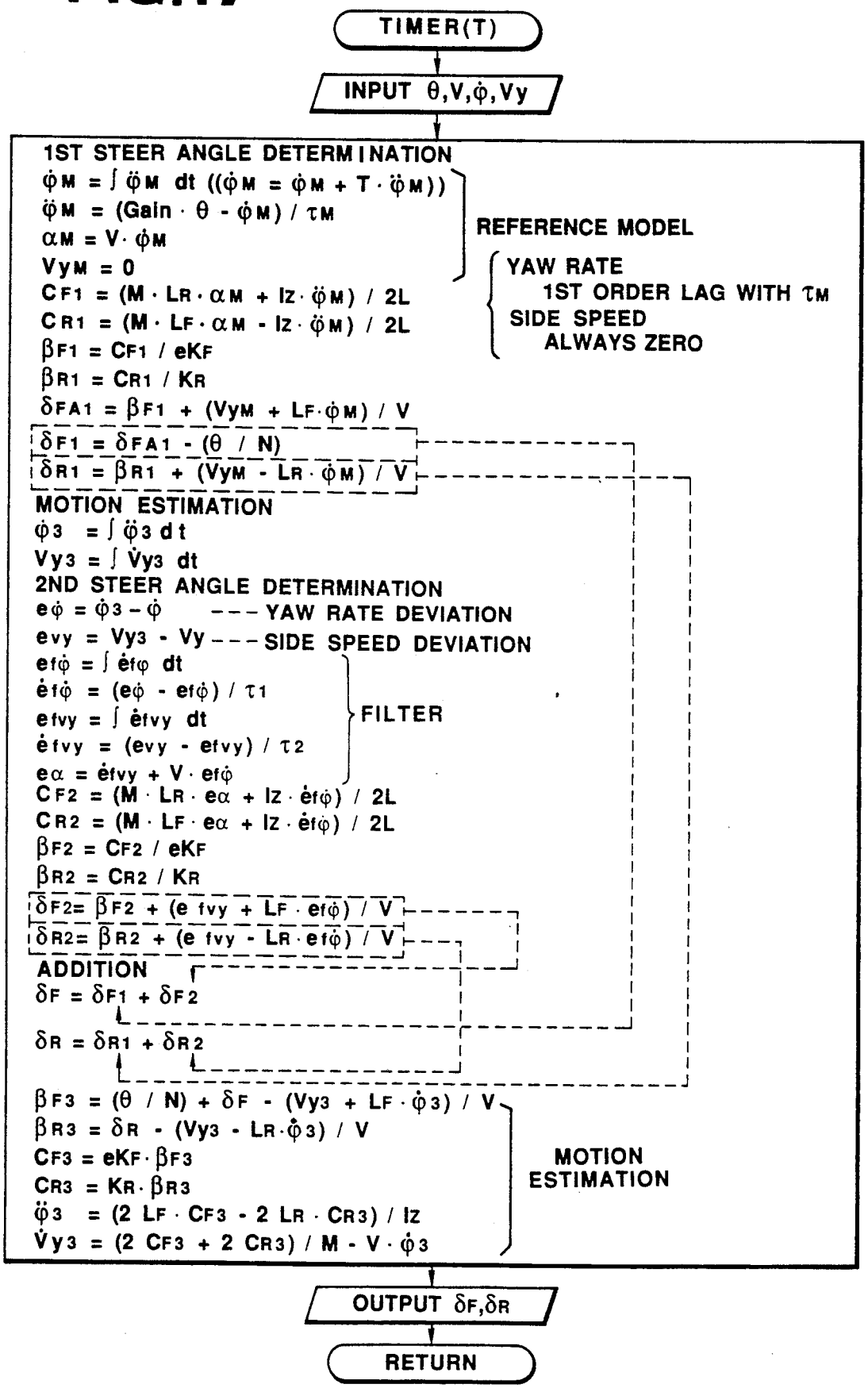
FIG. 17 is a flowchart showing a control program of the sixth embodiment.

A sixth embodiment of the present invention is shown in FIGS. 16 and 17. A vehicle motion control system of the sixth embodiment comprises components shown in FIG. 11, like the system of the fifth embodiment. As shown in FIG. 16, the control system of the sixth embodiment comprises a first auxiliary steer angle controlling section 121 for feedforward compensation, a second auxiliary steer angle controlling section 111 for feedback compensation, and a means for adding first and second output signals of the feedforward controlling section 121 and the feedback controlling section 111. The motion estimating section 110 and the feedback controlling section 111 of the sixth embodiment are substantially identical to those of the fifth embodiment shown in FIG. 13.

The feedback second controlling section Ill determines a second control input (vector) UP2 (front and rear wheel auxiliary steer angles) in the same manner as in the fifth embodiment. The feedforward first controlling section 121 of the sixth embodiment determines a first control input (vector) Upi (front and rear wheel auxiliary steer angles) according to a control method as disclosed in the section "3.1 Front and Rear Wheel Steer Angle Control System" of "Four-wheel Steering System Employing Model-following control" by Takeshi Fujishiro et al. which appeared in *Jidosha Gijutsu* (*Automotive Engineering*), Vol. 42, No. 3. The text of his document is herein incorporated by reference.

The feedforward controlling section 121 employs a reference model expressed by the following equation (106). The reference model is arbitrarily determined by a designer of the control system so as to obtain a desired response characteristics of the yaw rate and side speed to the primary steering input $\theta$.

$$\dot{X}r = ArXr + Br\theta \quad (106)$$

this equation, $XrT = [\phi M, VyM]$, $\phi M$ is a desired yaw rate, and Vym is a desired side speed.

The first control input Up1 is determined by the following equation (107).

$$Up1 = KrXr + Ku\theta \quad (107)$$

In this equation,
$Kr = Bp3^{-1}(Ar - Ap3)$, and $$Ku = Bp3^{-1} \cdot Br - \begin{bmatrix} 1/N \\ 0 \end{bmatrix}$$

The controller 5 of the sixth embodiment adds the first control input Up1 and the second control input Up2, and obtains a total control input Up which is the sum of the first and second control inputs Up1 and Up2. The control system places this final control input Up to the controlled vehicle 3, and steers the front and rear wheels in addition to the primary steering amount of the steering gear.

The controller 5 of the sixth embodiment performs a control program shown in FIG. 17. In addition to the mathematical operations of the control program shown in FIG. 14, the control program of FIG. 17 further includes mathematical operations of the first controlling section 121, and mathematical operations of the adding means. In the sixth embodiment, the front and rear wheel auxiliary steer angles determined by the feedback section 111 in the same manner as in the fifth embodiment are called, respectively, a second front wheel auxiliary steer angle $\delta F2$ and a second rear wheel auxiliary steer angle $\delta R2$.

The first controlling section 121 determines the desired yaw acceleration $\ddot{\phi}M = (Gain]\theta - \dot{\phi}M)/\tau M$, corresponding to the steering angle $\theta$ in accordance with the reference model. By integrating $\ddot{\phi}M$ according to $\dot{\phi}M = \dot{\phi}M + T \cdot \ddot{\phi}M$, the first controlling section 121 further determines the desired yaw rate $\dot{\phi}M$. (in this embodiment, the desired yaw rate $\dot{\phi}M$ is produced by a first order lag, with a time constant $\tau M$.) The first controlling section 121 of this embodiment holds the desired side speed Vym to be always equal to zero. That is, Vym = 0. When Vym = 0, the desired side (or lateral) acceleration $\alpha M$ is equivalent to a product between the desired yaw rate $\dot{\phi}M$ and the vehicle speed V. Therefore, the first controlling section 121 further determines the desired side acceleration $\alpha M$ by multiplying the desired yaw rate $\dot{\phi}M$ by the vehicle speed V. That is, $\alpha M = V \cdot \dot{\phi}M$. The first controlling section 121 further determines the front and rear wheel cornering force CF1 and CR1 to obtain the desired vehicle behavior of $\ddot{\phi}M$ and $\alpha M$ (that is, to achieve $\ddot{\phi}M$ and $\alpha M$ determined by the reference model), in accordance with the equations of vehicle motion. The following equations are used.

$$CF1 = (M \cdot LR \cdot \alpha M + IZ \cdot \ddot{\phi}M)/2L$$

$$CR1 = (M \cdot LF \cdot \alpha M + IZ \cdot \ddot{\phi}M)/2L$$

Then, the first controlling section 121 determines the front and rear wheel slip angles $\beta F1$ and $\beta R1$ to obtain these cornering forces, by the following equations.

$$\beta F1 = CR1/eKF$$

$$\beta R1 = CR1/KR$$

The front wheel steer angle $\delta FA1$ to satisfy the above-mentioned demands is given by;

$$\delta FA1 = \beta F1 + (VyM + LF \cdot \dot{\phi}M)/V$$

Therefore, the first controlling, section 121 determines the first front wheel auxiliary steer angle $\delta F1$ by;

$$\delta F1 = \delta FA1 - (\theta/N)$$

At the same time, the first controlling section 121 determines the first rear wheel auxiliary steer angle $\delta R1$ by;

$$\delta R1 = \beta R1 + (VyM - LR \cdot M)/V$$

Then, the controller 5 of the sixth embodiment adds the first and second front wheel auxiliary steer angles $\delta F1$ and $\delta F2$ by using the adding means, and determines a total front wheel auxiliary steer angle $\delta F$ which is the sum of $\delta F1$ and $\delta F2$. Similarly, the controller 5 determines a total rear wheel auxiliary steer angle $\delta R$ by adding the first rear wheel auxiliary steer angle $\delta R1$ and the second rear wheel auxiliary steer angle $\delta R2$. Then, the controller 5 delivers the front control signal representing the total front wheel auxiliary steer angle $\delta F$, and the rear control signal representing the total rear wheel auxiliary steer angle $\delta R$.

Figure 18A:
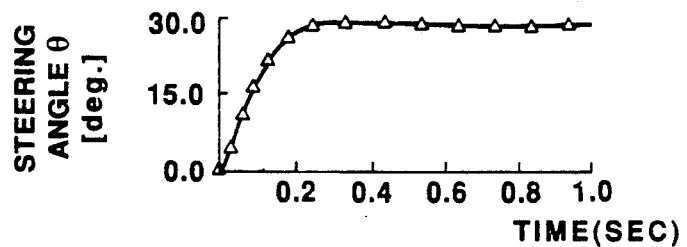
FIGS. 18A–18G are graphs showing effects of the control system of the sixth embodiment.
Figure 18B:
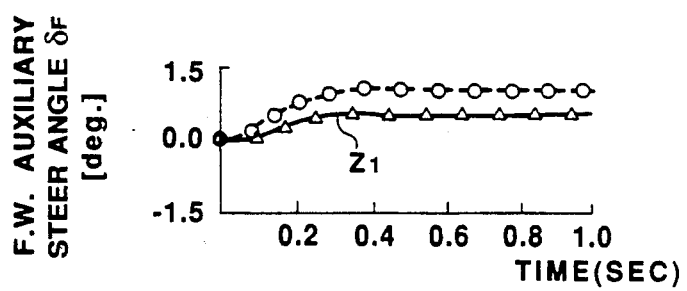
Figure 18C:
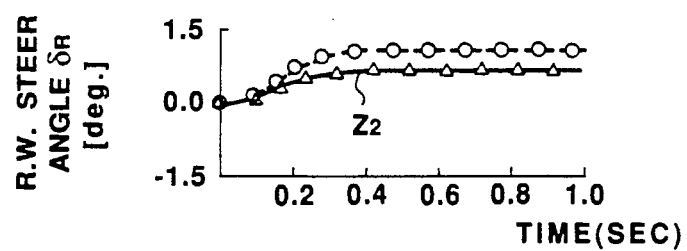
Figure 18D:
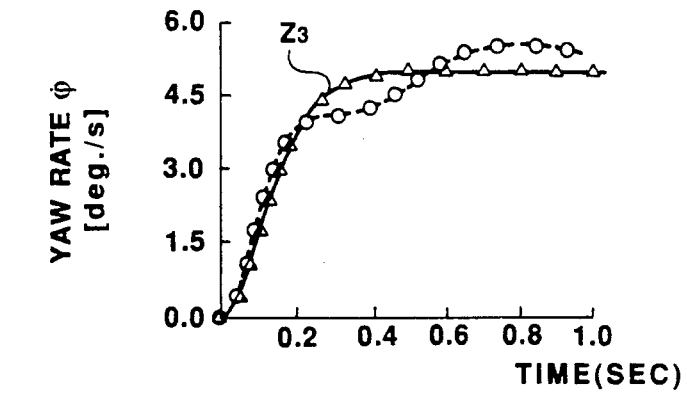
Figure 18E:
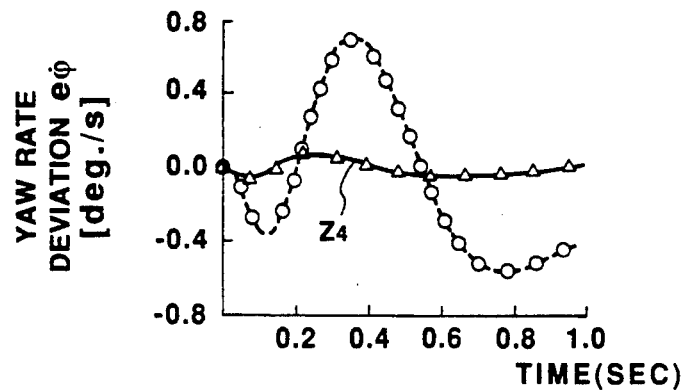
Figure 18F:
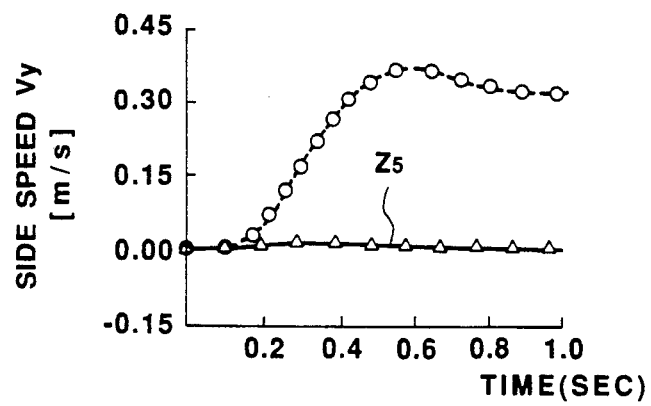
Figure 18G:
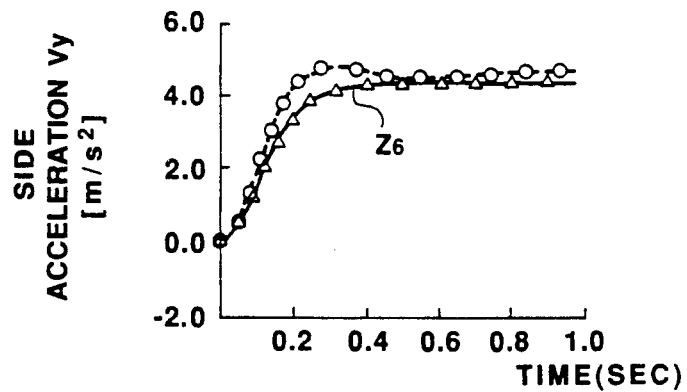

Therefore, the control system of the sixth embodiment can minimize undesired influences of the disturbance like the control system of the fifth embodiment as shown in FIGS. 15A-15H. Furthermore, the control system of the sixth embodiment can improve the vehicle response characteristics as seen from the results of a simulation shown in FIGS. 18A-18G. When the steering wheel angle $\theta$ is varied with time as shown in FIG. 18A, the control system responds according to the above-mentioned reference Fujishiro et al. yields characteristics of the front and rear wheel auxiliary steer angles 5F and 5R, the yaw rate $\dot{\phi}$, the yaw rate deviation e$\dot{\phi}$ of the sensed actual yaw rate $\dot{\phi}$ from the desired yaw rate determined by the reference model, the side speed Vy and the side acceleration $\dot{V}$, as shown by broken lines in FIGS. 18B-18G. These characteristics differ widely from the reference model. In contrast to these characteristics, the control system of the sixth embodiment can improve the characteristics as shown by lines Z1-Z6. The characteristics obtained by the sixth embodiment are very close to the reference model.

Figure 19:
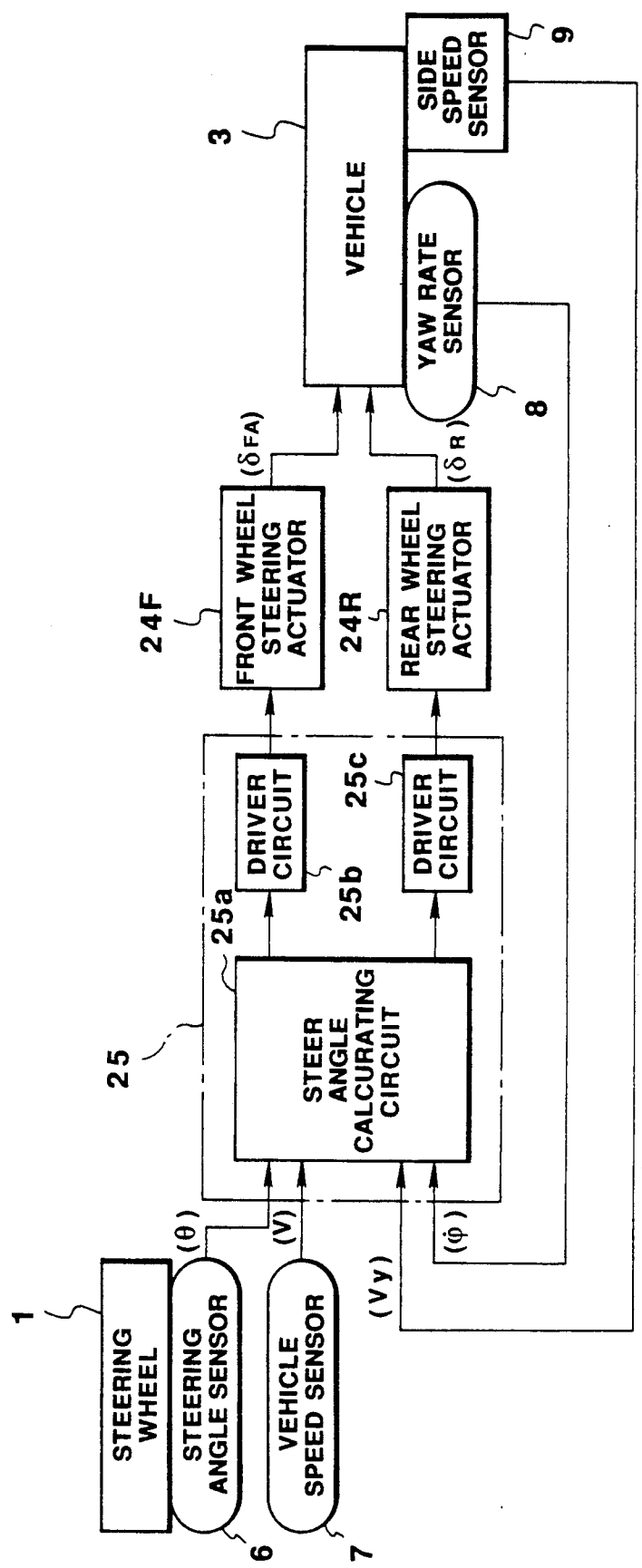
FIGS. 19 and 20 are block diagrams showing a control system of a seventh embodiment.
Figure 20:
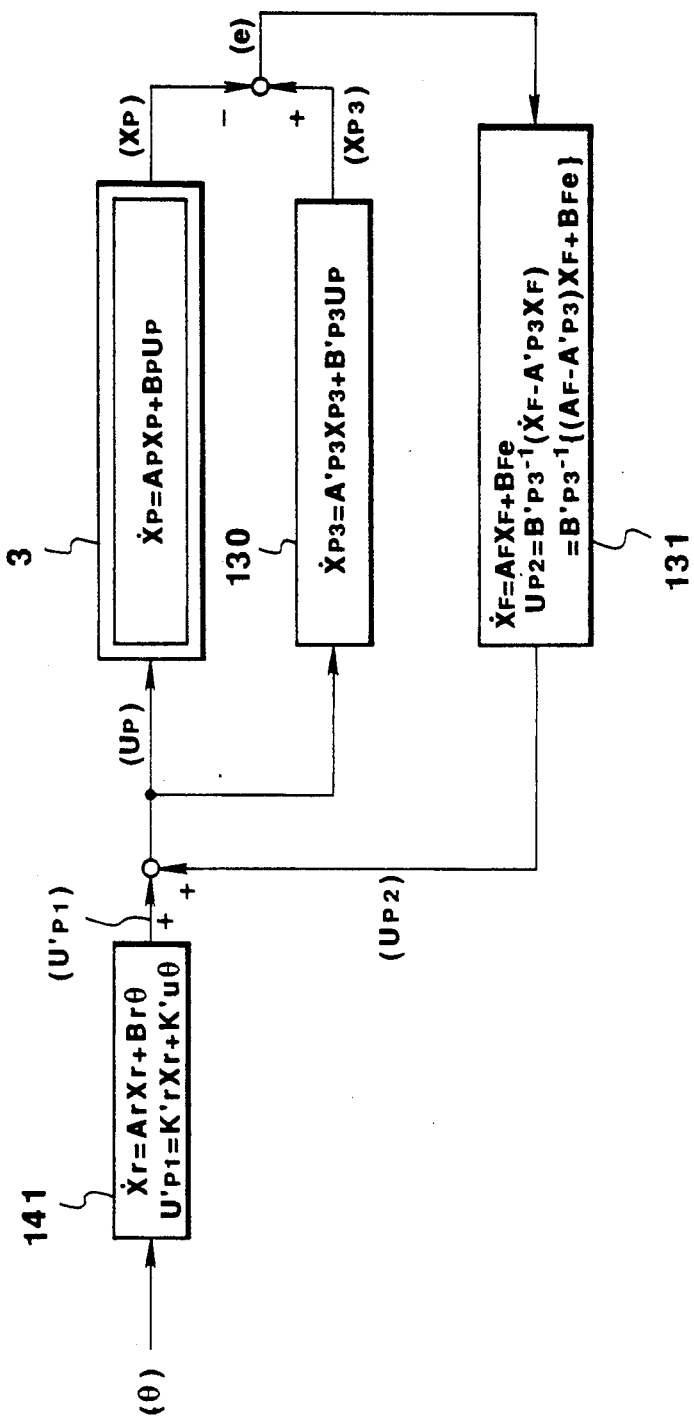

A seventh embodiment of the present invention is shown in FIGS. 19 and 20. As shown in FIG. 19, a control system of the seventh embodiment has no steering gear. The steering wheel 1 is not mechanically connected with the front wheels. In the seventh embodiment, the actual front wheel steer angle is determined only by a front wheel steering actuator 24F. A controller 25 of the seventh embodiment electronically controls the front wheel steer angle $\delta$FA and the rear wheel steer angle $\delta$R by using the front and rear steering actuators 24F and 24R. The controller 25 has a steer angle calculating circuit (or section) 25a for calculating the front and rear wheel steer angles $\delta$FA and $\delta$R, and two driver circuits 25b and 25c for driving the front and rear steering actuators 24F and 24R. The front steering actuator 24F steers the front wheels of the controlled vehicle 3 so that the actual front wheel steer angle is made equal to the calculated front wheel steer angle $\delta$FA. The rear steering actuator 24R steers the rear wheels so that the actual rear wheel steer angle is made equal to the calculated rear wheel steer angle $\delta$R.

FIG. 20 shows the control system of the seventh embodiment in terms of transfer characteristics. The arrangement of FIG. 20 is similar to that of FIG. 16. In the seventh embodiment, however, there is no mechanical steering input corresponding to $\theta$. Therefore, the vehicle 3 produces the control output Xp determined by $\dot{X}p = ApXp + BpUp$. A motion estimating section 130 of the seventh embodiment determines a desired control output Xp3 determined by $\dot{X}p3 = A'p3Xp3 + B'p3Up$. A second steer angle controlling section 131 of the seventh embodiment determines a second control input Up2 (second front and rear wheel steer angles), from the deviation e between Xp and Xp3 in the same manner as in the second controlling section 111 shown in FIG. 16. A first steer angle controlling section 141 determines a first control input U'p1 (first front and rear wheel steer angles) in the same manner as in the first controlling section 121 shown in FIG. 16. The controller of the seventh embodiment determines a final control input Up which is the sum of the first and second control inputs U'p1 and Up2, and applies this control input Up upon the front and rear wheels of the controlled vehicle 3. Therefore, the control system of the seventh embodiment can offer the same advantageous effects as in the sixth embodiment.

What is claimed is:

1. A steering control system for a wheeled vehicle, comprising:

a steering means for steering said wheeled vehicle in response to a control signal representing a control steering input;

a sensing means for sensing an actual vehicle motion variable of said vehicle; and a controlling means for determining an estimated vehicle motion variable corresponding to said control steering input by using a predetermined estimator transfer characteristic which is a transfer characteristic relating a vehicle steering response to a steering input, producing a deviation signal representing a deviation of said actual vehicle motion variable from said estimated vehicle motion variable, and further producing said control signal in accordance with said deviation signal so as to reduce said deviation by using a predetermined compensator transfer characteristic which is a transfer characteristic relating the steering input to the vehicle steering response, and a predetermined filter transfer characteristic, said compensator transfer characteristic being in the form of a fraction where the denominator of said fraction comprises said estimator transfer characteristic.

2. A steering control system according to claim 1 wherein said controlling means comprises a feedback compensating means for receiving said deviation signal and determining said control steering input in accordance with said deviation by using said compensator transfer characteristic and said filter transfer characteristic, and an estimating means for receiving said control signal and determining said estimated vehicle motion variable in accordance with said control steering input by using said estimator transfer characteristic.

3. A steering control system according to claim 2 wherein said estimating means includes an integrating means for approximating a mathematical process of integration and determining said estimated motion variable by solving a differential equation.

4. A steering control system according to claim 3 wherein said sensing means comprises a vehicle motion sensing means for sensing said vehicle motion variable, and a vehicle speed sensing means for sensing a vehicle speed of said vehicle, and said estimator transfer characteristic of said estimating means comprises a parameter which is dependent on said vehicle speed.

5. A steering control system according to claim 1, wherein said steering means comprises a primary steering means for steering said wheeled vehicle by varying an actual front wheel steer angle of said wheeled vehicle in accordance with a driver's steering command, and an auxiliary steering means for steering said wheeled vehicle in response to said control signal, said sensing means comprises a vehicle motion sensing means for sensing said actual vehicle motion variable of said wheeled vehicle, and said control system further comprises a commanding means for producing a steering command signal representing the driver's steering command.

6. A steering control system for a wheeled vehicle, comprising:

a steering means for steering said wheeled vehicle in response to a control signal representing a control steering input;

a sensing means for sensing an actual vehicle motion variable of said vehicle; and a controlling means for determining an estimated vehicle motion variable corresponding to said control steering input by using a predetermined estimator transfer characteristic which is a transfer characteristic relating a vehicle steering response to a steering input, producing a deviation signal representing a deviation of said actual vehicle motion variable from said estimated vehicle motion variable, and further producing said control signal in accordance with said deviation signal so as to reduce said deviation by using a predetermined compensator transfer characteristic which is a transfer characteristic relating the steering input to the vehicle steering response, and a predetermined filter transfer characteristic, wherein said steering means comprises a primary steering means for steering said wheeled vehicle by varying an actual front wheel steer angle of said wheeled vehicle in accordance with a driver's steering command, and an auxiliary steering means for steering said wheeled vehicle in response to said control signal, said sensing means comprises a vehicle motion sensing means for sensing said actual vehicle motion variable of said wheeled vehicle, and said control system further comprises a commanding means for producing a steering command signal representing the driver's steering command, and wherein said controlling means comprises an estimating means for receiving said steering command signal and said control signal, determining a first estimated vehicle output resulting from said steering command by using a first estimator transfer characteristic for determining the vehicle steering response from the steering input, further determining a second estimated vehicle output resulting from said control input by using a second estimator transfer characteristic for determining the vehicle steering response from the steering input, and further determining said estimated vehicle motion variable which is a sum of said first and second estimated vehicle outputs.

7. A steering control system according to claim 6 wherein said controlling means further comprises a comparing means for comparing said actual vehicle motion variable with said estimated vehicle motion variable and producing said deviation signal, and a feedback compensating means for producing said control signal in accordance with said deviation signal by using said compensator transfer characteristic which is in a form of a function of said second estimator transfer characteristic and which is designed to determine a steering input from a vehicle response.

8. A steering control system according to claim 7 wherein said feedback compensating means of said controlling means includes a means for determining said control steering input by using said compensator transfer characteristic which is in an inverse form of said estimator transfer characteristic, and said filter transfer characteristic which is such a characteristic that a steady state gain is equal to one, and a difference resulting from subtraction of an order of a numerator of said filter transfer characteristic from an order of a denominator of said filter transfer characteristic is equal to or higher than a difference resulting from subtraction of an order of a numerator of said estimator transfer characteristic from an order of a denominator of said estimator transfer characteristic.

9. A steering control system according to claim 8 wherein said sensing means further comprises a vehicle speed sensing means for sensing a vehicle speed of said vehicle, and said estimating means includes a means for determining said estimated vehicle motion variable by using said first and second estimator transfer characteristics each of which has at least one parameter which is dependent on said vehicle speed.

10. A steering control system according to claim 9 wherein said feedback compensating means comprises a filtering means for receiving said deviation signal and producing a filter output signal from said deviation signal according to said filter transfer characteristic, and a steer angle determining means for receiving said filter output signal and producing said control signal from said filter output signal according to said compensator transfer characteristic.

11. A steering control system according to claim 10 wherein said vehicle motion sensing means comprises a yaw rate sensor for sensing an actual yaw rate of said wheel vehicle, and said controlling means includes a means for receiving said actual yaw rate as said actual vehicle motion variable, and determining an estimated yaw rate as said estimated vehicle motion variable.

12. A steering control system according to claim 7 wherein said controlling means further comprises a feedforward compensating means for determining a feedforward control steering input from said steering command by using a predetermined reference model, whereas said feedback compensating means determines a feedback control steering input according to said compensator transfer characteristic and said filter transfer characteristic, and said controlling means further comprising a summing means for producing said control signal lo representing a sum of said feedforward control input and said feedback control steering input.

13. A steering control system according to claim 12 wherein said feedforward compensating means includes a means for determining said feedforward control steering input by using a predetermined reference transfer characteristic representing said reference model, and said first and second estimator transfer characteristics.

14. A steering control system according to claim 13 wherein said feedforward compensating means includes a means for determining a desired first controlled motion variable representing a desired vehicle steering response from said steering command according to said reference transfer characteristic and further determining said feedforward control steering input so as to achieve said desired first controlled motion variable.

15. A steering control system according to claim 13 wherein said feedforward compensating means includes a means for determining said feedforward control input so as to control a first controlled variable representing a vehicle steering response, and said feedback compensating means includes a means for determining said feedback control input so as to control a second controlled variable which is different from said first controlled variable.

16. A steering control system according to claim 15 wherein said vehicle motion sensing means comprises a yaw rate sensor for sensing an actual yaw rate of said wheeled vehicle, said motion estimating means includes a means for determining an estimated yaw rate as said estimated vehicle motion variable which represents a vehicle steering response of yawing motion, and said feedback compensating means includes a means for determining said feedforward control input so as to control said first controlled variable representing a vehicle steering response of side translation motion.

17. A steering control system according to claim 7 wherein said commanding means comprises a steering wheel, said primary steering means comprises a front steering linkage mechanically connecting said steering wheel with front wheels of said wheeled vehicle, said auxiliary steering means comprises a front auxiliary steering actuator for steering said front wheels of said wheeled vehicle in response to a front wheel control signal representing an auxiliary front wheel steer angle, and a rear auxiliary steering actuator for steering rear wheels of said wheeled vehicle in response to a rear control signal representing an auxiliary rear wheel steer angle, said vehicle motion sensing means comprises a yawing motion sensing means for sensing an actual yawing motion variable of said wheeled vehicle, and a side motion sensing means for sensing an actual side motion variable of said wheeled vehicle, said estimating means comprises a yawing motion estimating means for determining an estimated yawing motion variable from said steering command, said auxiliary front wheel steer angle and said auxiliary rear wheel steer angle by using a first yawing motion estimator transfer characteristic for determining a first estimated yawing output from said steering command, a second yawing motion estimator transfer characteristic for determining a second estimated yawing output from said auxiliary front wheel steer angle and a third yawing motion estimator transfer characteristic for determining a third estimated yawing output from said auxiliary rear wheel steer angle, and a side motion estimating means for determining an estimated side motion variable from said steering command, said auxiliary front wheel steer angle and said auxiliary rear wheel steer angle by using a first side motion estimator transfer characteristic for determining a first estimated side motion output from said steering command, a second side motion estimator transfer characteristic for determining a second estimated side motion output from said auxiliary front wheel steer angle and a third side motion estimator transfer characteristic for determining a third estimated side motion output from said auxiliary rear wheel steer angle, said comparing means comprises a means for determining a yawing deviation between said actual yawing motion variable and said estimated yawing motion variable and a means for determining a side motion deviation between said actual side motion variable and said estimated side motion variable, and said feedback compensating means includes a means for determining said auxiliary front and rear wheel steer angles from said yawing deviation and said side motion deviation so as to reduce said yawing deviation and said side motion deviation by using said second and third yawing estimator transfer characteristics, said second and third side motion estimator transfer characteristics, a predetermined filter transfer characteristic relating to a yawing motion and a second filter transfer characteristic relating to a side motion.

18. A steering control system according to claim 17 wherein said feedback compensating means includes a means for producing said front and rear control signals by using said first filter transfer characteristic which is such a characteristic that a steady state gain is equal to one, and an order difference resulting from subtraction of an order of a numerator of said filter transfer characteristic from an order of a denominator of said filter transfer characteristic is equal to or higher than a difference resulting from subtraction of an order of a numerator of said second yawing estimator transfer characteristic from an order of a denominator of said second yawing estimator transfer characteristic and that said order difference of said first filter transfer characteristic is equal to or higher than an order difference resulting from subtraction of an order of a numerator of said estimator transfer characteristic from an order of a denominator of said estimator transfer characteristic.

19. A steering control system according to claim 18 wherein said feedback compensating means includes a means for producing said front and rear control signals by using said second filter transfer characteristic which is such a characteristic that a steady state gain is equal to one, and an order difference resulting from subtraction of an order of a numerator of said second filter transfer characteristic from an order of a denominator of said second filter transfer characteristic is equal to or higher than an order difference resulting from subtraction lo of an order of a numerator of said second side motion estimator transfer characteristic from an order of a denominator of said second side motion estimator transfer characteristic and that said order difference of said second filter transfer characteristic is equal to or higher than an order difference resulting from subtraction of an order of a numerator of said third side motion estimator transfer characteristic from an order of a denominator of said third side motion estimator transfer characteristic.

20. A steering control system according to claim 19 wherein
said sensing means further comprises a vehicle speed sensing means for sensing a vehicle speed of said vehicle, said yawing motion estimating means includes a means for determining said estimated yawing motion variable by using said first, second and third yawing motion estimator transfer characteristics each of which has at least one parameter which is dependent on said vehicle speed, and
said side motion estimating means includes a means for lo determining said estimated side motion variable by using said first, second and third side motion estimator transfer characteristics each of which has at least one parameter which is dependent on said vehicle speed.

21. A steering control system according to claim 20 wherein said controlling means further comprises a feedforward compensating means for determining a feedforward control front wheel steer angle and a feedforward control rear wheel steer angle from said steering command by using a predetermined reference model, whereas said feedback compensating means determines a feedforward control input, said controlling means further comprising a summing means for producing said front control signal by adding said auxiliary front wheel steer angle lo determined by said feedback compensating means and said feedforward control front wheel steer angle determined by said feedforward compensating means, and said rear control signal by adding said auxiliary rear wheel steer angle determined by said feedback compensating means and said feedforward control rear wheel steer angle determined by said feedforward compensating means.

22. A steering control system according to claim 21 wherein said feedforward compensating means includes a means for determining said front and rear wheel steer angles so as to achieve a desired yawing motion variable determined in accordance with said steering command by a predetermined reference yawing transfer characteristic, and a desired side motion variable determined in accordance with said steering command by a predetermined reference side motion transfer characteristic.

23. A steering control system for a wheeled vehicle, comprising:
- a steering means for steering said wheeled vehicle in response to a control signal representing a control steering input;
- a sensing means for sensing an actual vehicle motion variable of said vehicle; and
- a controlling means for determining an estimated vehicle motion variable corresponding to said control steering input by using a predetermined estimator transfer characteristic which is a transfer characteristic relating a vehicle steering response to a steering input, producing a deviation signal representing a deviation of said actual vehicle motion variable from said estimated vehicle motion variable, and further producing said control signal in accordance with said deviation signal so as to reduce said deviation by using a predetermined compensator transfer characteristic which is a transfer characteristic relating the steering input to the vehicle steering response, and a predetermined filter transfer characteristic,
- wherein said control system further comprises a commanding means for producing a steering command signal representing a driver's steering command, and said controlling means comprises a first steering input determining means for a receiving said steering command signal and producing a first steering input signal in accordance with said steering command, and a second steering input determining means for determining a second steering input in accordance with said deviation so as to reduce said deviation by using said compensator transfer characteristic and said filter transfer characteristic, and producing a second steering input signal, and said steering means includes a means for steering said wheeled vehicle in accordance with said first and second steering input signals.

24. A steering control signal according to claim 23 wherein said commanding means comprises a steering wheel and a means for producing said steering command signal substantially proportional to a steering wheel angle of said steering wheel, said steering means comprises a front steering actuator for steering front wheels of said wheeled vehicle in response to a front wheel control signal representing a front wheel steer angle, and a rear steering actuator for steering rear wheels of said wheeled vehicle in response to a rear control signal representing a rear wheel steer angle, said sensing means comprises a yawing motion sensing means for sensing an actual yawing motion variable of said wheeled vehicle, and a side motion sensing means for sensing an actual side motion variable of said wheeled vehicle, said controlling means comprises an estimating means for determining an estimated yawing motion variable from said front wheel steer angle and said rear wheel steer angle by using a first yawing motion estimator transfer characteristic for determining a first estimated yawing output from said front wheel steer angle, and a second yawing motion estimator transfer characteristic for determining a second estimated yawing output from said rear wheel steer angle, and further determining an estimated side motion variable from said front wheel steer angle and said rear wheel steer angle by using a first side motion estimator transfer characteristic for determining a first estimated side motion output from said front wheel steer angle, and a second side motion estimator transfer characteristic for determining a second estimated side motion output from said rear wheel steer angle, and a comparing means for determining a yawing deviation between said actual yawing motion variable and said estimated yawing motion variable and further determining a side motion deviation between said actual side motion variable and said estimated side motion variable, and said second steering input determining means includes a feedback compensating means for determining said front and rear wheel steer angles from said yawing deviation and said side motion deviation so as to reduce said yawing deviation and said side motion deviation by using said first and second yawing estimator transfer characteristics, said first and second side motion estimator transfer characteristics, a predetermined first filter transfer characteristic relating to a yawing motion and a second filter transfer characteristic relating to a side motion.

25. A steering control system according to claim 23 wherein said commanding means comprises a steering wheel for producing a mechanical steering command signal, and a means for producing an electric steering command signal substantially proportional to an angular displacement of said steering wheel, said first steering input determining means comprises a steering gear for receiving said mechanical steering command signal and determining a primary steering input according to a predetermined steering ratio, and said steering means comprises lo a primary steering means for steering said wheeled vehicle by varying an actual front wheel steer angle in accordance with said primary steering input, and an auxiliary steering means for steering said wheeled vehicle in accordance with said control signal.

26. A steering control system for a wheeled vehicle, comprising:
- a steering means for steering said wheeled vehicle in response to a control signal representing a control steering input;
- a sensing means for sensing an actual vehicle motion variable of said vehicle; and
- a controlling means for determining an estimated vehicle motion variable corresponding to said control steering input by using a predetermined estimator transfer characteristic which is a transfer characteristic relating a vehicle steering response to a steering input, producing a deviation signal representing a deviation of said actual vehicle motion variable from said estimated vehicle motion variable, and further producing said control signal in accordance with said deviation signal so as to reduce said deviation by using a predetermined compensator transfer characteristic which is a transfer characteristic relating the steering input to the vehicle steering response, and a predetermined filter transfer characteristic,
- wherein said controlling means comprises a feedback compensating means for determining said control steering input by using said compensator transfer characteristic which is in an inverse form of said estimator transfer characteristic, and said filter transfer characteristic which has such a characteristic that a steady state gain is equal to one, and a difference resulting from subtraction of an order of a numerator of said filter transfer characteristic from an order of a denominator of said filter transfer characteristic is equal to or higher than a difference resulting from subtraction of an order of a numerator of said estimator transfer characteristic from an order of a denominator of said estimator transfer characteristic.

27. A steering control system according to claim 26 wherein said controlling means further comprises an estimating means for determining said estimated motion variable by using said estimator transfer characteristic which is expressed by a fraction whose numerator is a first order differential equation and whose denominator is a second order differential equation, and said feedback compensating means includes a means for determining said control steering input by using said filter transfer characteristic which is expressed by a fraction whose numerator is a zero order differential equation and whose denominator is a first order differential equation.

28. A steering control system according to claim 26 wherein said sensing means comprises a vehicle motion sensing means for sensing said vehicle motion variable, and a vehicle speed sensing means for sensing a vehicle speed of said vehicle, and said controlling means further comprises a vehicle motion estimating means for determining said estimated vehicle motion variable by using said estimator transfer characteristic which has at least one parameter which is dependent on said vehicle speed.

* * * * *